US012804620B2

(12) United States Patent
Xiong et al.

(10) Patent No.: US 12,804,620 B2
(45) Date of Patent: Nov. 17, 2026

(54) TIME DOMAIN WINDOW FOR JOINT CHANNEL ESTIMATION

(71) Applicant: Intel Products IP LLC, Santa Clara, CA (US)

(72) Inventors: Gang Xiong, Beaverton, OR (US); Yingyang Li, Beijing (CN); Sergey Sosnin, Zavolzhie (RU); Gregory Ermolaev, Nizhny Novgorod (RU); Debdeep Chatterjee, San Jose, CA (US)

(73) Assignee: Intel Products IP LLC, Santa Clara, CA (US)

( * ) Notice: Subject to any disclaimer, the term of this patent is extended or adjusted under 35 U.S.C. 154(b) by 144 days.

(21) Appl. No.: 18/284,132

(22) PCT Filed: Jul. 18, 2022

(86) PCT No.: PCT/US2022/037480
§ 371 (c)(1),
(2) Date: Sep. 26, 2023

(87) PCT Pub. No.: WO2023/003816
PCT Pub. Date: Jan. 26, 2023

(65) Prior Publication Data
US 2024/0179689 A1 May 30, 2024

Related U.S. Application Data

(60) Provisional application No. 63/282,511, filed on Nov. 23, 2021, provisional application No. 63/275,360, (Continued)

(51) Int. Cl.
*H04W 72/0446* (2023.01)

(52) U.S. Cl.
CPC ............................... *H04W 72/0446* (2013.01)

(58) Field of Classification Search
CPC ......... H04W 72/0446; H04W 72/1268; H04W 72/231; H04W 72/232; H04L 1/08; (Continued)

(56) References Cited

U.S. PATENT DOCUMENTS

2019/0306922 A1* 10/2019 Xiong ................... H04W 72/21
2019/0313442 A1* 10/2019 Hosseini ............... H04L 5/0091
(Continued)

FOREIGN PATENT DOCUMENTS

JP 2024515010 4/2024
WO WO-2023003816 A1 1/2023

OTHER PUBLICATIONS

"Discussion on joint channel estimation for PUSCH"; Panasonic; 3GPP TSG RAN WG1 #106-bis-e R1-2109459 e-Meeting, Oct. 11-19, 2021 (Year: 2021).*
(Continued)

*Primary Examiner* — Benjamin H Elliott, IV
(74) *Attorney, Agent, or Firm* — Schwegman Lundberg & Woessner, P.A.

(57) ABSTRACT

A computer-readable storage medium stores instructions to configure a UE for joint channel estimation of uplink transmissions in a Fifth Generation New Radio (5G NR) and beyond wireless network, and to cause the UE to perform operations. The operations include decoding DCI or higher layer signaling received from a base station. The DCI or the higher layer signaling indicates a number of PUSCH repetitions forming the uplink transmissions. The operations further include decoding higher layer signaling received from the base station, the higher layer signaling indicating a size of a time domain window (TDW) associated with the uplink transmissions. The TDW has a number of slots equal (Continued)

900 to the size. Each of the PUSCH repetitions within the TDW is associated with a same carrier phase and a same transmit power.

20 Claims, 12 Drawing Sheets

Related U.S. Application Data filed on Nov. 3, 2021, provisional application No. 63/245,133, filed on Sep. 16, 2021, provisional application No. 63/223,324, filed on Jul. 19, 2021.

(58) Field of Classification Search
CPC ... H04L 1/1664; H04L 1/1854; H04L 1/1858; H04L 1/1861; H04L 1/1864; H04L 1/1887; H04L 1/1893; H04L 25/0226; H04L 25/024; H04L 5/0044; H04L 5/0048; H04L 5/0053; H04L 5/0055; H04L 5/0094; H04L 25/0202
See application file for complete search history.

(56) References Cited

U.S. PATENT DOCUMENTS

| | | | | |
|---|---|---|---|---|
| 2022/0104138 | A1* | 3/2022 | Park | H04W 72/0473 |
| 2022/0224456 | A1* | 7/2022 | Yi | H04L 1/1864 |
| 2022/0353862 | A1* | 11/2022 | Cozzo | H04W 72/0473 |
| 2022/0399971 | A1* | 12/2022 | Sridharan | H04W 72/1268 |
| 2023/0046073 | A1* | 2/2023 | Shim | H04W 56/005 |
| 2024/0179689 | A1* | 5/2024 | Xiong | H04L 5/0094 |
| 2024/0349301 | A1* | 10/2024 | Fukui | H04W 72/232 |
| 2025/0048272 | A1* | 2/2025 | Xiong | H04W 52/325 |
| 2025/0080286 | A1* | 3/2025 | Yi | H04W 52/221 |
| 2025/0279872 | A1* | 9/2025 | Lin | H04W 72/21 |

OTHER PUBLICATIONS

"Discussion on joint channel estimation for PUSCH"; Intel Corporation; 3GPP TSG RAN WG1 #106b-e R1-2109626 e-Meeting, Oct. 11-19, 2021 (Year: 2021).*
"Discussion on joint channel estimation for PUSCH"; Wilus; 3GPP TSG RAN WG1 #106bis-e R1-2110329 e-Meeting, Oct. 11-19, 2021 (Year: 2021).*
International Search Report PCT/US2023/012508 mailed May 26, 2023 (Year: 2023).*
"Japanese Application Serial No. 2023-554042, Notification of Reasons for Refusal mailed Jan. 2025", w English translation, 7 pgs.
"Japanese Application Serial No. 2023-554042, Response Filed Apr. 8, 2025 to Notification of Reasons for Refusal mailed Jan. 21, 2025", w English Claims, 17 pgs.
Vivo, "Discussion on Joint channel estimation for PUSCH", 3GPP Tsg Ran WG1 #105-e-R1-2104378, (Jan. 11, 2021), 14 pages.
"International Application Serial No. PCT/US2022/037480, International Search Report mailed Nov. 10, 2022", 3 pgs.
"International Application Serial No. PCT/US2022/037480, Written Opinion mailed Nov. 10, 2022", 4 pgs.
China Telecom, "FL Summary of joint channel estimation for PUSCH", R1-2105979, 3GPP TSG RAN WG1 Meeting #105-e, (May 24, 2021), 37 pgs.
Huawei, "Discussion on Joint channel estimation for PUSCH", R1-2104241, 3GPP TSG RAN WG1 Meeting #105-e, (May 12, 2021), 12 pgs.
Qualcomm Incorporated, "Joint channel estimation for PUSCH", R1-2104687, 3GPP TSG RAN WG1 Meeting #105-e, (May 12, 2021), 10 pgs.
Vivo, "Discussion on Joint channel estimation for PUSCH", R1-2102536, 3GPP TSG RAN WG1 Meeting #104b-e, (Apr. 7, 2021), 13 pgs.
"International Application Serial No. PCT US2022 037480, International Preliminary Report on Patentability mailed Feb. 1, 2024", 6 pgs.
"Korean Application Serial No. 10-2023-7033472, Voluntary Amendment Filed Feb. 5, 2024", w English Claims, 26 pgs.
"Japanese Application Serial No. 2023-554042, Notification of Reasons for Refusal mailed Sep. 10, 2024", w English translation, 7 pgs.
"Japanese Application Serial No. 2023-554042, Response Filed Oct. 30, 2024 to Notification of Reasons for Refusal mailed Sep. 10, 2024", W English Claims, 20 pgs.
Nokia, Shanghai Bell, "Joint channel estimation for PUSCH coverage enhancements", 3GPP TSG RAN WG1 #105-e-R1-2105903 enhancements,1 months, 05 months, and 11 days, (2021), 11 pgs.
OPPO, "Consideration on Joint channel estimation for PUSCH", 3GPP TSG RAN WG1 #105-e-R2-2104794,1 months, 05 months, and 12 days, (2021), 8 pgs.
Sharp, "Joint channel estimation for multi-slot PUSCH", 3GPP TSG RAN WG1 #105-e-R1-2105642, 05 months, 12 days, (2021), 10 pgs.
"Korean Application Serial No. 10-2023-7033472, Notice of Preliminary Rejection mailed Feb. 23, 2026", w English translation, 13 pgs.
Interdigital, Inc., "Joint channel estimation for PUSCH", 3GPP TSG RAN WG1 #104-bis-e R1-2103009 e-Meeting, Apr. 20, 2021.
Moderator, "Feature lead summary 2 on support of Type A Pusch repetitions for Msg3", 3GPP TSG RAN WG1 #105-e R1-2106008 e-Meeting, May 10, 2021, 63 pages.
ZTE, Corporation, "discussion on joint channel estimation for PUSCH", 3GPP TSG RAN WG1 #105-E, 3GPP server R1-2104332, May 12, 2021, 12 pages.
"Korean Application Serial No. 10-2023-7033472, Response filed Jun. 23, 2026 to Notice of Preliminary Rejection mailed Feb. 23, 2026", W English Claims, 31 pgs.

* cited by examiner

TIME DOMAIN WINDOW FOR JOINT CHANNEL ESTIMATION

PRIORITY CLAIM

This application is a U.S. National Stage Filing under 35 U.S.C. 371 from International Application No. PCT/US2022/037480, filed Jul. 18, 2022 and published in English as WO 2023/003816 on Jan. 26, 2023, which claims the benefit of priority to the following patent applications:

U.S. Provisional Patent Application No. 63/223,324, filed Jul. 19, 2021, and entitled "ON TIME DOMAIN WINDOW FOR JOINT CHANNEL ESTIMATION OF UPLINK TRANSMISSION;"

U.S. Provisional Patent Application No. 63/245,133, filed Sep. 16, 2021, and entitled "TIME DOMAIN WINDOW FOR JOINT CHANNEL ESTIMATION OF UPLINK TRANSMISSION;"

U.S. Provisional Patent Application No. 63/275,360, filed Nov. 3, 2021, and entitled "TIME DOMAIN WINDOW FOR JOINT CHANNEL ESTIMATION OF UPLINK TRANSMISSION;" and U.S. Provisional Patent Application No. 63/282,511, filed Nov. 23, 2021, and entitled "TIME DOMAIN WINDOW FOR JOINT CHANNEL ESTIMATION OF UPLINK TRANSMISSION."

Each of the above-listed patent applications is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MulteFire, LTE-U), and fifth-generation (5G) networks and beyond including 5G new radio (NR) (or 5G-NR) networks, 5G-LTE networks such as 5G NR unlicensed spectrum (NR-U) networks and other unlicensed networks including Wi-Fi, CBRS (OnGo), etc. Other aspects are directed to mechanisms for time domain window (TDW) configuration for joint channel estimation of uplink transmissions in 5G-NR and beyond networks.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As the current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. Further enhanced operation of LTE and NR systems in the licensed, as well as unlicensed spectrum, is expected in future releases and 5G-NR (and beyond) systems. Such enhanced operations can include mechanisms for time domain window (TDW) configuration for joint channel estimation of uplink transmissions in 5G-NR and beyond networks.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
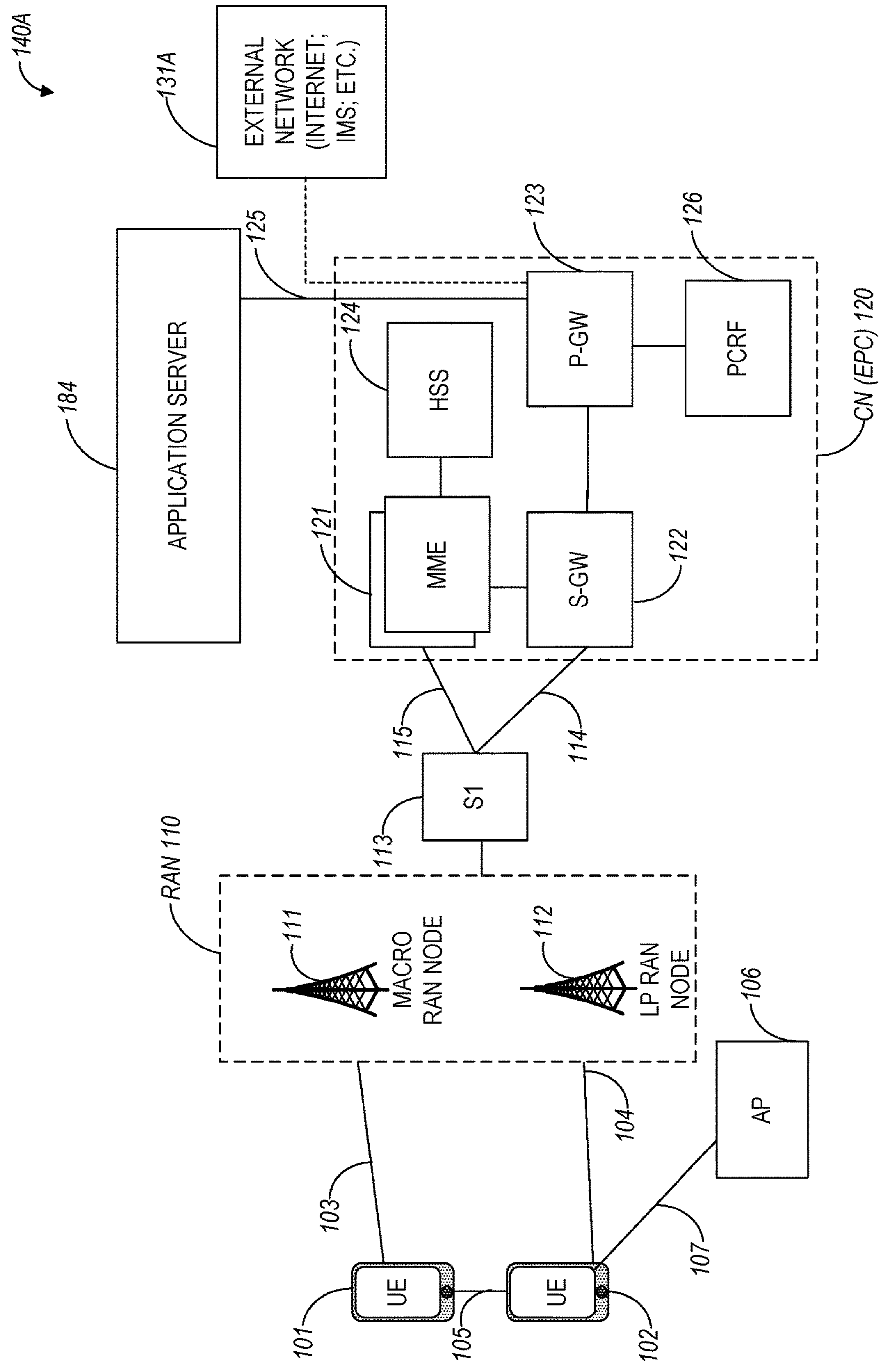
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and further frequencies and Spectrum Access System (SAS) in 3.55-3.7 GHZ and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IOT) UE or a Cellular IoT (CIOT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IOT (eNB-IOT) UE and Further Enhanced (FeNB-IOT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. Connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, the capacity of the equipment, the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband IoT (NB-IOT).

An NG system architecture can include the RAN 110 and a 5G core (5GC) network 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

Figure 1B:
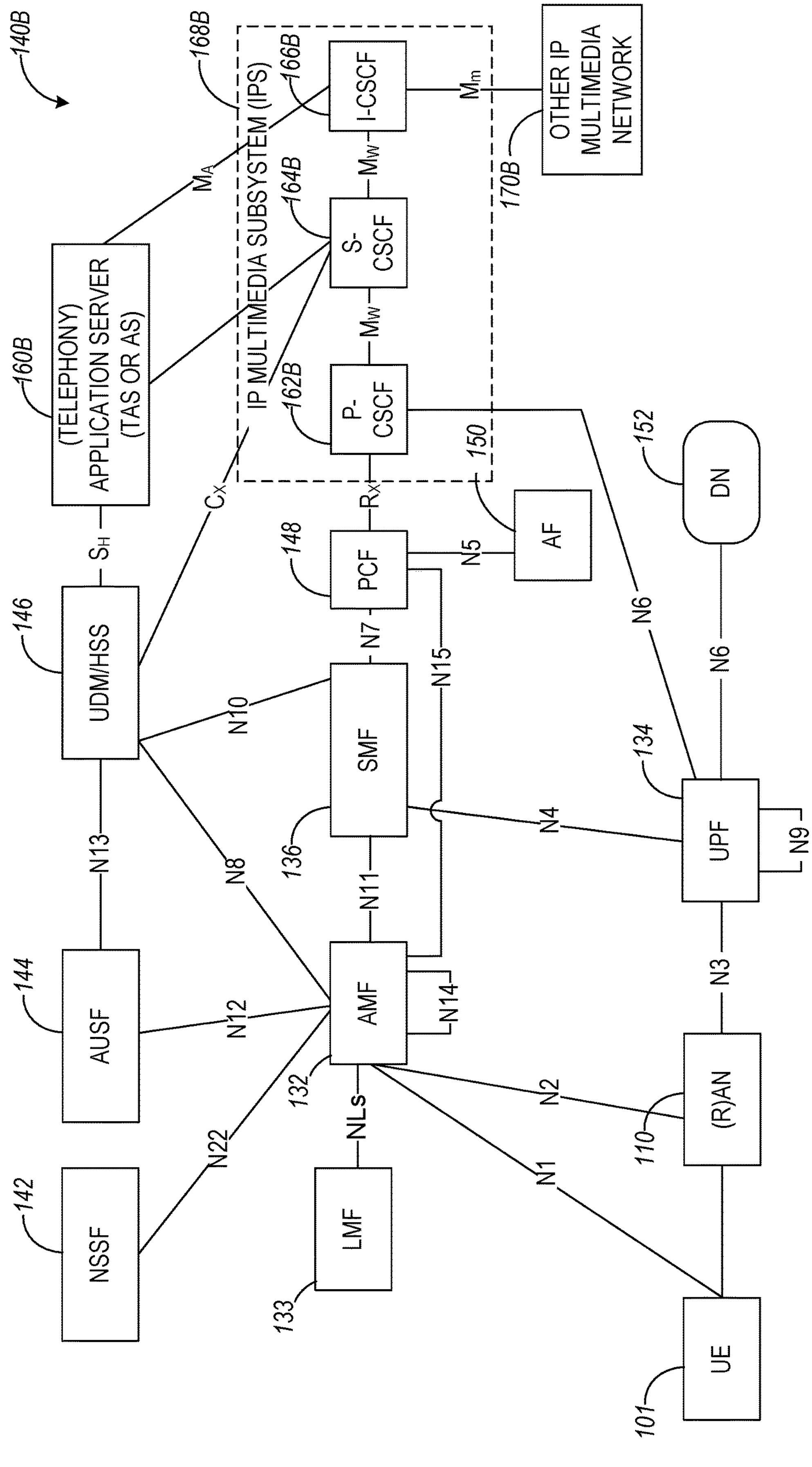
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, location management function (LMF) 133, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The LMF 133 may be used in connection with 5G positioning functionalities. In some aspects, LMF 133 receives measurements and assistance information from the next generation radio access network (NG-RAN) 110 and the mobile device (e.g., UE 101) via the AMF 132 over the NLs interface to compute the position of the UE 101. In some aspects, NR positioning protocol A (NRPPa) may be used to carry the positioning information between NG-RAN and LMF 133 over a next generation control plane interface (NG-C). In some aspects, LMF 133 configures the UE using the LTE positioning protocol (LPP) via AMF 132. The NG RAN 110 configures the UE 101 using radio resource control (RRC) protocol over LTE-Uu and NR-Uu interfaces.

In some aspects, the 5G system architecture 140B configures different reference signals to enable positioning measurements. Example reference signals that may be used for positioning measurements include the positioning reference signal (NR PRS) in the downlink and the sounding reference signal (SRS) for positioning in the uplink. The downlink positioning reference signal (PRS) is a reference signal configured to support downlink-based positioning methods.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server 160B, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
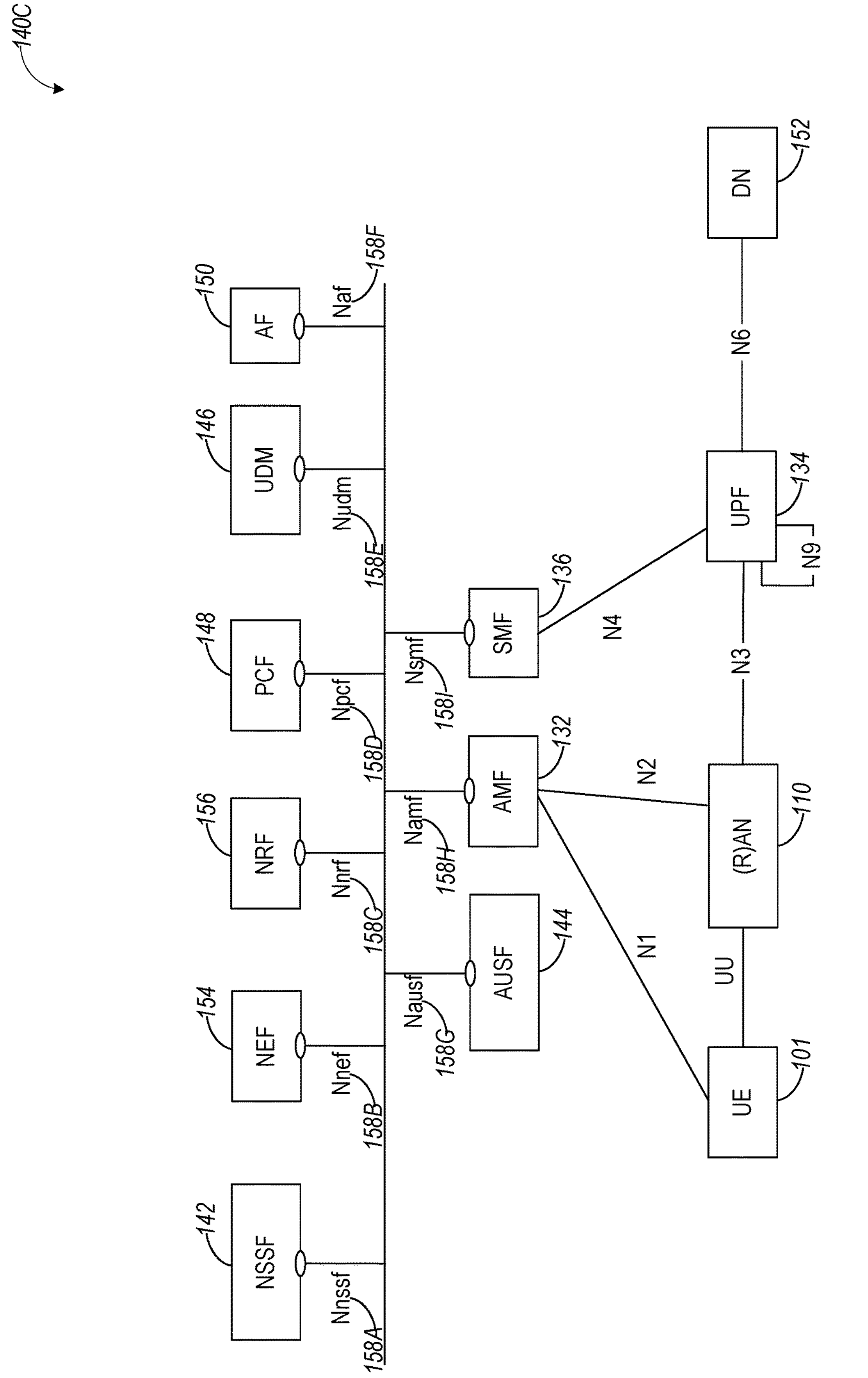

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) are not shown in FIG. 1C can also be used.

Figure 2:
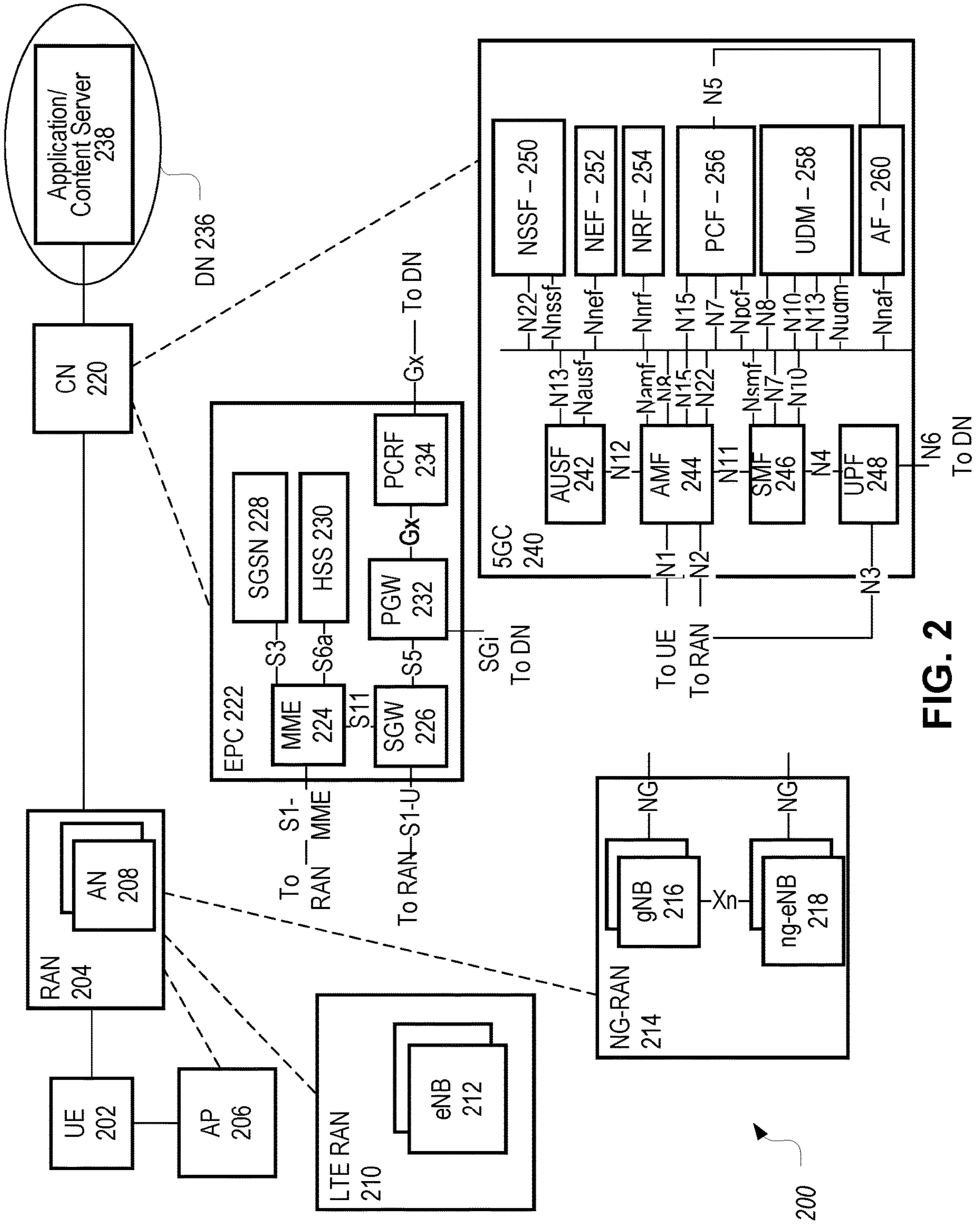
FIG. 2, FIG. 3, and FIG. 4 illustrate various systems, devices, and components that may implement aspects of disclosed embodiments.
Figure 3:
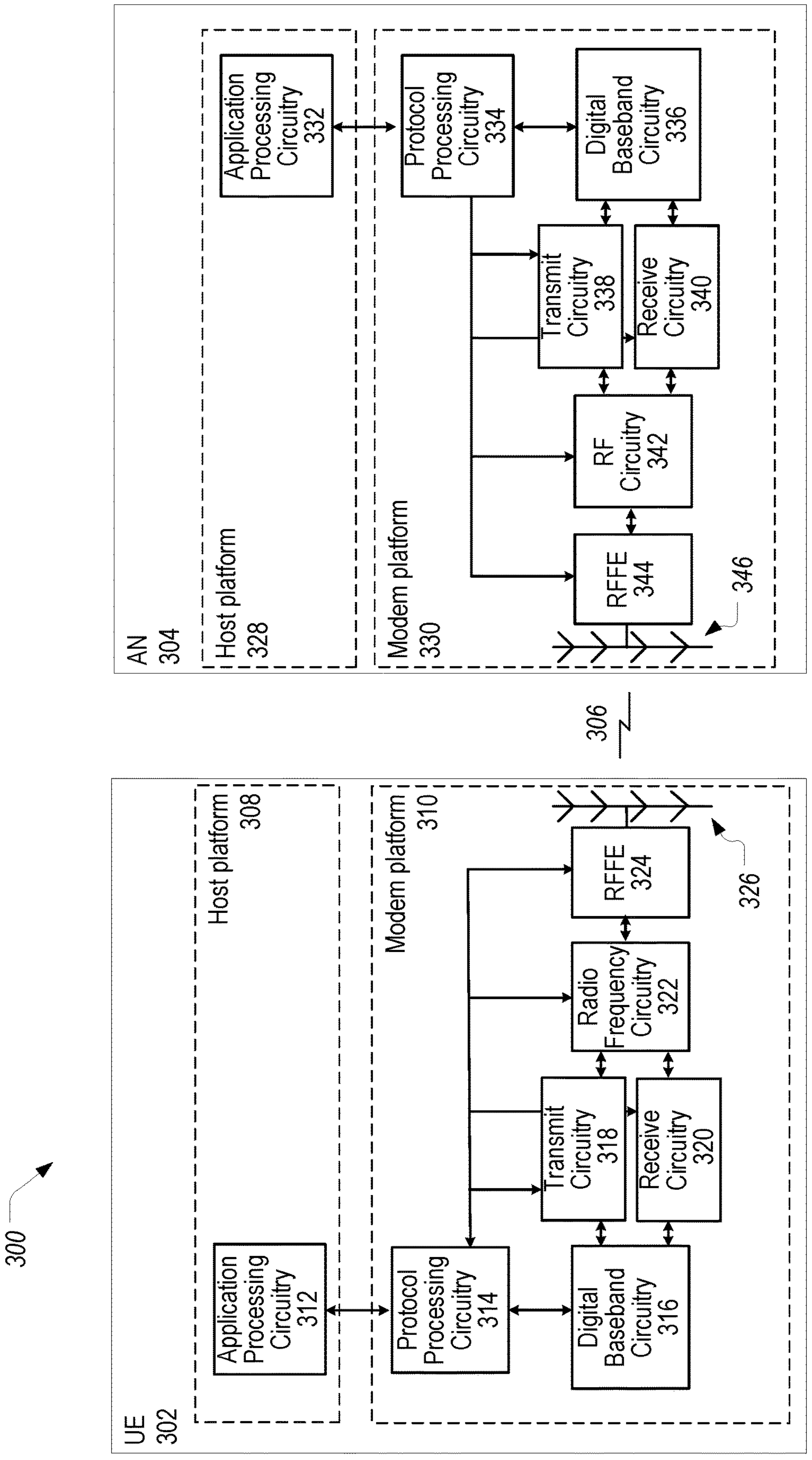
Figure 4:
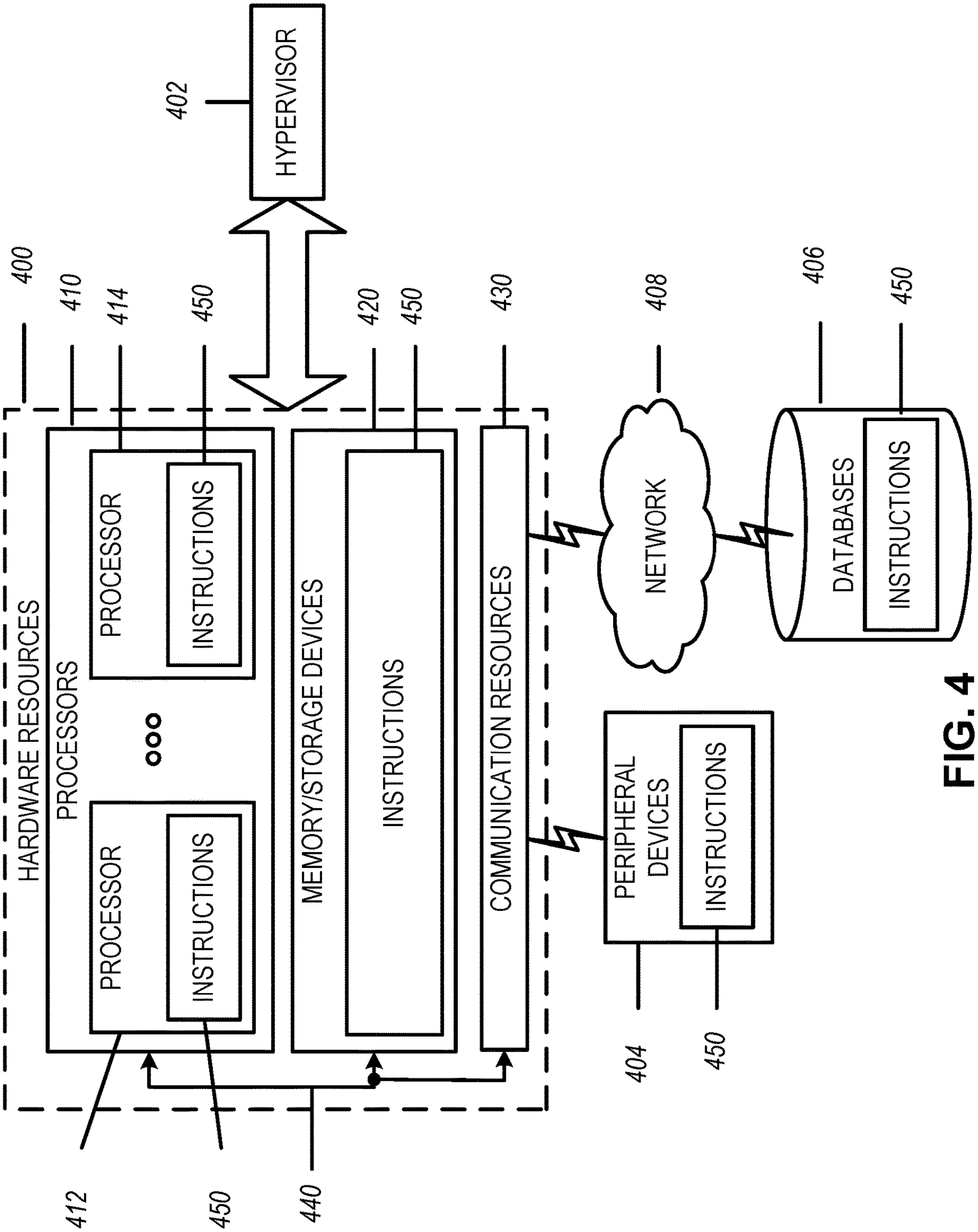

FIG. 2, FIG. 3, and FIG. 4 illustrate various systems, devices, and components that may implement aspects of disclosed embodiments in different communication systems, such as 5G-NR (and beyond) networks. UEs, base stations (such as gNBs), and/or other nodes (e.g., satellites or other NTN nodes) are discussed in connection with FIGS. 1A-4 can be configured to perform the disclosed techniques.

FIG. 2 illustrates a network 200 in accordance with various embodiments. Network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, network 200 may include a plurality of UEs coupled directly with one another via a sidelink interface. The UEs may be M2M/D2D devices that communicate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, and media, as well as applications/software to sense and control ongoing vehicular and pedestrian traffic. The RSU may provide very low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN214 and an AMF 244 (e.g., N2 interface).

The NG-RAN 214 may provide a 5G-NR air interface with the following characteristics: variable SCS; CP-OFDM for DL, CP-OFDM, and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include a synchronization signal and physical broadcast channel (SS/PBCH) block (SSB) which is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 which includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 220 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for the provision of IMS services. The PGW 232 may be coupled with a PCRF 234 via a Gx reference point.

The PCRF 234 is the policy and charging control element of the LTE CN 220. The PCRF 234 may be communicatively coupled to the app/content server 238 to determine appropriate QoS and charging parameters for service flows. The PCRF 234 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point for interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine the allowed NSSAI and the mapping to the subscribed S-NSSAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs or used for other purposes such as analytics. Additionally, the NEF 252 may exhibit a Nnef service-based interface.

The NRF 254 may support service discovery functions, receive NF discovery requests from NF instances, and provide the information of the discovered NF instances to the NF instances. NRF 254 also maintains information on available NF instances and their supported services. As used herein, the terms “instantiate,” “instantiation,” and the like may refer to the creation of an instance, and an “instance” may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant to policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store the subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, and application request information for multiple UEs 202) for the NEF 252. The Nudr service-based interface may be exhibited by the UDR to allow the UDM 258, PCF 256, and NEF 252 to access a particular set of stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

FIG. 3 schematically illustrates a wireless network 300 in accordance with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more layer operations to facilitate transmission or reception of data over connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are “below” layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318 receive circuitry 320, RF circuitry 322, RFFE 324, and antenna panels 326 (referred to generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 302 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with the like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The one or more processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example sections below. For example, baseband circuitry associated with one or more of the preceding figures may be configured to operate in accordance with one or more of the examples set forth below. For another example, circuitry associated with a UE, base station, satellite, network element, etc. as described above in connection with one or more of the preceding figures may be configured to operate in accordance with one or more of the examples set forth below in the example section.

The term "application" may refer to a complete and deployable package, or environment to achieve a certain function in an operational environment. The term "AI/ML application" or the like may be an application that contains some artificial intelligence (AI)/machine learning (ML) models and application-level descriptions. In some embodiments, an AI/ML application may be used for configuring or implementing one or more of the disclosed aspects.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks.

Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principal component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific to an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML-host informs the actor about the output of the ML algorithm, and the actor decides on an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. NR can evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

For cellular systems, coverage is an important factor for successful operation. Compared to LTE, NR can be deployed at a relatively higher carrier frequency in frequency range 1 (FR1), e.g., at 3.5 GHz. In this case, coverage loss is expected due to a larger path loss, which makes it more challenging to maintain an adequate quality of service. Typically, uplink coverage is the bottleneck for system operation considering the low transmit power on the UE side.

In NR Rel-15, several repetitions can be configured for the transmission of physical uplink shared channel (PUSCH) to help improve the coverage performance. When repetition is employed for the transmission of the physical uplink control channel (PUSCH) and PUSCH, same time domain resource allocation (TDRA) is used in each slot. In addition, inter-slot frequency hopping can be configured to improve performance by exploiting frequency diversity. In Rel-16, the number of repetitions for PUSCH can be dynamically indicated in the DCI.

To further improve the coverage performance, the advanced receiver including a joint channel estimation algorithm can be employed, which can help in improving the channel estimation performance, and hence the overall link budget of uplink transmission. This is of primary importance as coverage enhancement solutions are mainly targeted for low SNR regimes where channel estimation is typically a performance bottleneck.

For joint channel estimation, a time domain window can be defined during which a UE is expected to maintain power consistency and phase continuity among PUSCH or PUCCH transmissions subject to power consistency and phase continuity requirements. Further, the size of the time domain window may be explicitly configured by higher layers via radio resource control (RRC) signaling. Note that when joint channel estimation is applied for PUSCH repetition type A based on available slots, given the fact that available slots may not be consecutive in time, certain designs may need to be considered for the time domain window for joint channel estimation.

The disclosed techniques include mechanisms on the time domain window for joint channel estimation of uplink transmissions.

As mentioned above, to further improve the coverage performance, the advanced receiver including a joint channel estimation algorithm can be employed, which can help in improving the channel estimation performance, and hence the overall link budget of uplink transmission. This is of primary importance as coverage enhancement solutions are mainly targeted for low SNR regimes where channel estimation is typically a performance bottleneck.

For joint channel estimation, a time domain window can be defined during which a UE is expected to maintain power consistency and phase continuity among PUSCH or PUCCH transmissions subject to power consistency and phase continuity requirements. Furthermore, the size of the time domain window may be explicitly configured by higher layers via radio resource control (RRC) signaling. In some aspects, when joint channel estimation is applied for PUSCH repetition type A based on available slots, given the fact that available slots may not be consecutive in time, certain configurations disclosed herein may be considered for the time domain window for joint channel estimation. Embodiments of mechanisms on the time domain window for joint channel estimation of uplink transmission are provided herein.

In the following embodiments, the uplink transmission may include, but not be limited to the following cases:

(a) PUSCH repetition type A based on physical slots;
(b) PUSCH repetition type A based on available slots;
(c) PUSCH repetition type B;
(d) PUCCH with same time domain resource allocation in each slot;
(e) PUCCH with sub-slot-based repetition;

(f) transport block (TB) processing over multiple slots (TBoMS);

(g) multiple PUSCHs with different TBs;

(h) Msg3 repetition in case of 4-step random access (RACH) procedure; and (i) MsgA PUSCH repetition in case of 2-step RACH procedure.

In some embodiments, for a time domain window for joint channel estimation of uplink transmission, including PUSCH and PUCCH repetition, a contiguous time domain window may be employed for joint channel estimation. In some aspects, the start of the time domain window is the first repetition of PUSCH or PUCCH.

In some aspects, when PUSCH repetition type B is employed, the start of the time domain window is the first actual repetition or nominal repetition. When transport block (TB) processing over multiple slots (TBoMS) is employed, the start of the time domain window is the first slot allocated for the TBoMS transmission.

In some aspects, the size of the time domain window may be configured by higher layers via minimum system information (MSI), remaining minimum system information (RMSI), other system information (OSI), or dedicated radio resource control (RRC) signaling or dynamically indicated in the downlink control information (DCI) or a combination thereof.

For this option, when the number of repetitions for PUSCH repetition type A or TBoMS or PUCCH is $N^{Rep}$ and the size of the time domain window is indicated as $N^{Window}$, the number of time domain windows can be determined as $\lceil N^{Rep}/N^{Window} \rceil$. In some aspects, the size of the last time domain window may be smaller than the indicated size.

In addition, within a time domain window for joint channel estimation, if UE cannot maintain phase continuity and/or power consistency due to at least one of, but not limited to the following conditions, the time domain window is not further extended:

(a) If a PUSCH or PUCCH repetition is canceled due to collision with semi-static DL/UL configuration including DL symbols, synchronization signal block (SSB), control resource set (CORESET) with type 0 common search space (CSS), invalid UL symbols, or dynamic slot format indicator (SFI) carried by DCI format 2_0, uplink cancellation indication (UL CI), uplink transmission with higher priority, etc.

(b) If a PUSCH overlaps with PUCCH and UCI is multiplexed on the PUSCH repetition or one of the PUSCH and PUCCH repetitions is canceled.

(c) If a UE needs to receive DL transmission from the gNB and when UE transmits another uplink channel(s) or signal(s) between two successive PUSCH or PUCCH repetitions.

(d) If a UE needs to transmit another uplink channel/signal in a different carrier simultaneously with or without dynamic power sharing.

(e) If a UE needs to change frequency resources between PUSCH and/or PUCCH repetitions.

In some embodiments, if the UE cannot maintain phase continuity and/or power consistency within a time domain window for joint channel estimation due to the aforementioned conditions, the UE may not need to restart demodulation reference signal (DMRS) bundling or maintain phase continuity and power consistency within the time domain window for the remaining PUSCH or PUCCH repetitions.

Alternatively, in another option, if the UE cannot maintain phase continuity and/or power consistency within a time domain window for joint channel estimation due to the aforementioned conditions, and when the remaining number of repetitions after canceled PUSCH or PUCCH within the time domain window is greater than one, UE may still restart the DMRS bundling or need to maintain phase continuity and power consistency within the time domain window for the remaining PUSCH or PUCCH repetitions.

Figure 5:
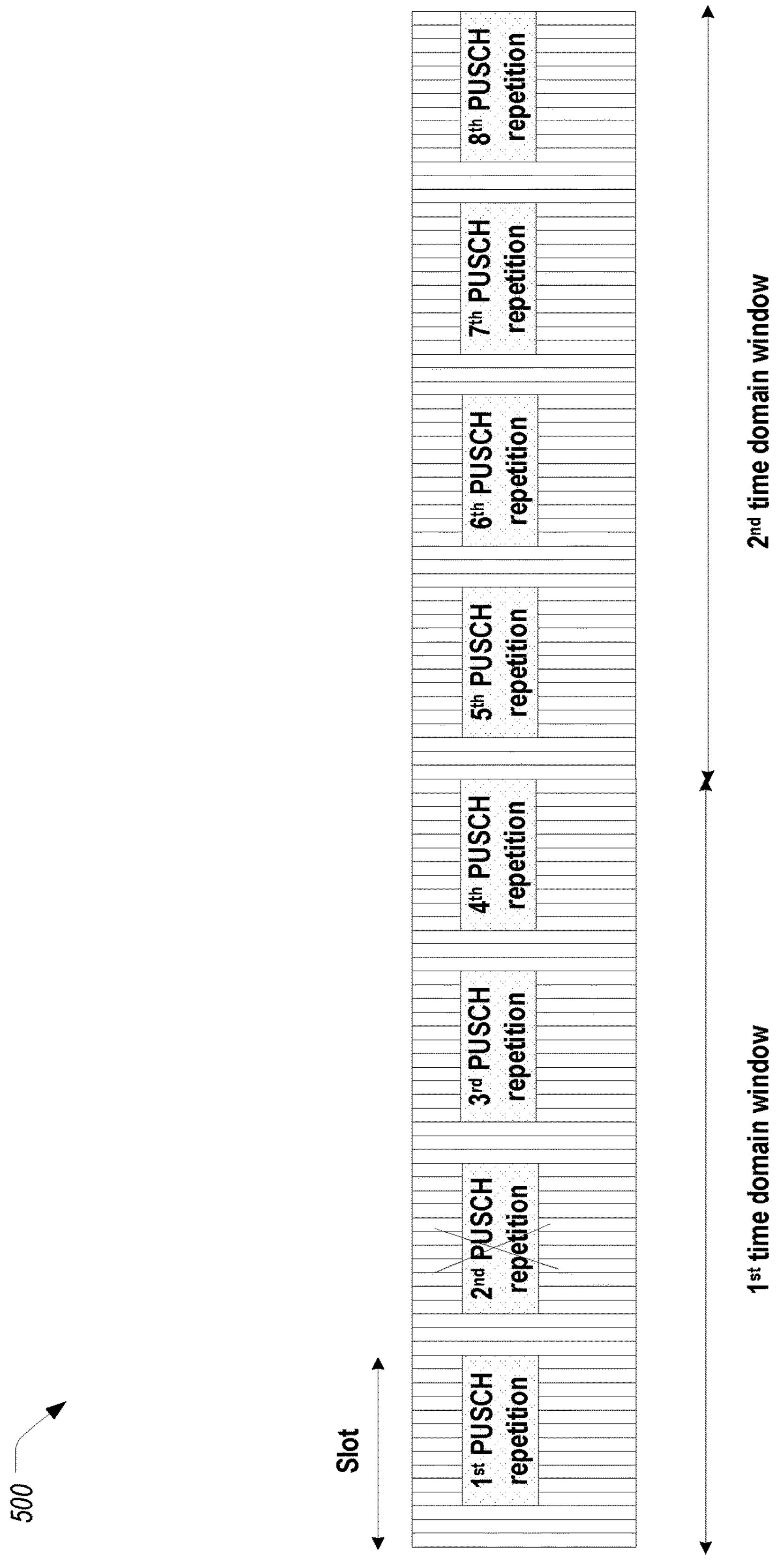
FIG. 5 illustrates a diagram of multiple time domain windows for joint channel estimation as Option 1, in accordance with some aspects.

FIG. 5 illustrates diagram 500 of multiple time domain windows for joint channel estimation as Option 1, in accordance with some aspects. In FIG. 5, eight repetitions are used for PUSCH repetition type A, and the size of the time domain window is configured as four slots. In this case, two-time domain windows for joint channel estimation are used for 8 PUSCH repetitions. In the example, in the first time domain window, the UE may not maintain the phase continuity or power consistency due to the cancellation of the 2nd PUSCH repetition. For this option, the first-time domain window is not postponed. Further, the UE may restart the DMRS bundling or need to maintain the phase continuity and power consistency for 3rd and 4th PUSCH repetitions within the first-time domain window for joint channel estimation.

In some embodiments, for a time domain window for joint channel estimation of uplink transmission, including PUSCH and PUCCH repetition, a contiguous time domain window may be employed for joint channel estimation.

Further, within a time domain window for joint channel estimation, if UE cannot maintain phase continuity and/or power consistency due to at least one of, but not limited to the following conditions, the time domain window is further extended until the number of indicated size is met:

(a) If a PUSCH or PUCCH repetition is canceled due to collision with semi-static DL/UL configuration including DL symbols, synchronization signal block (SSB), control resource set (CORESET) with type 0 common search space (CSS), invalid UL symbols, or dynamic slot format indicator (SFI) carried by DCI format 2_0, uplink cancellation indication (UL CI), uplink transmission with higher priority, etc.

(b) If a PUSCH overlaps with PUCCH and UCI is multiplexed on the PUSCH repetition or one of the PUSCH and PUCCH repetitions is canceled.

(c) If a UE needs to receive DL transmission from the gNB and when UE transmits another uplink channel(s) or signal(s) between two successive PUSCH or PUCCH repetitions.

(d) If a UE needs to transmit another uplink channel/signal in a different carrier simultaneously with or without dynamic power sharing.

(e) If a UE needs to change frequency resources between PUSCH and/or PUCCH repetitions.

For this option, if the UE cannot maintain phase continuity and/or power consistency within a time domain window for joint channel estimation due to the aforementioned conditions, and when the remaining number of repetitions after canceled PUSCH or PUCCH within the time domain window is greater than one, the UE may still restart the DMRS bundling or need to maintain phase continuity and power consistency within the time domain window for the remaining PUSCH or PUCCH repetitions.

Figure 6:
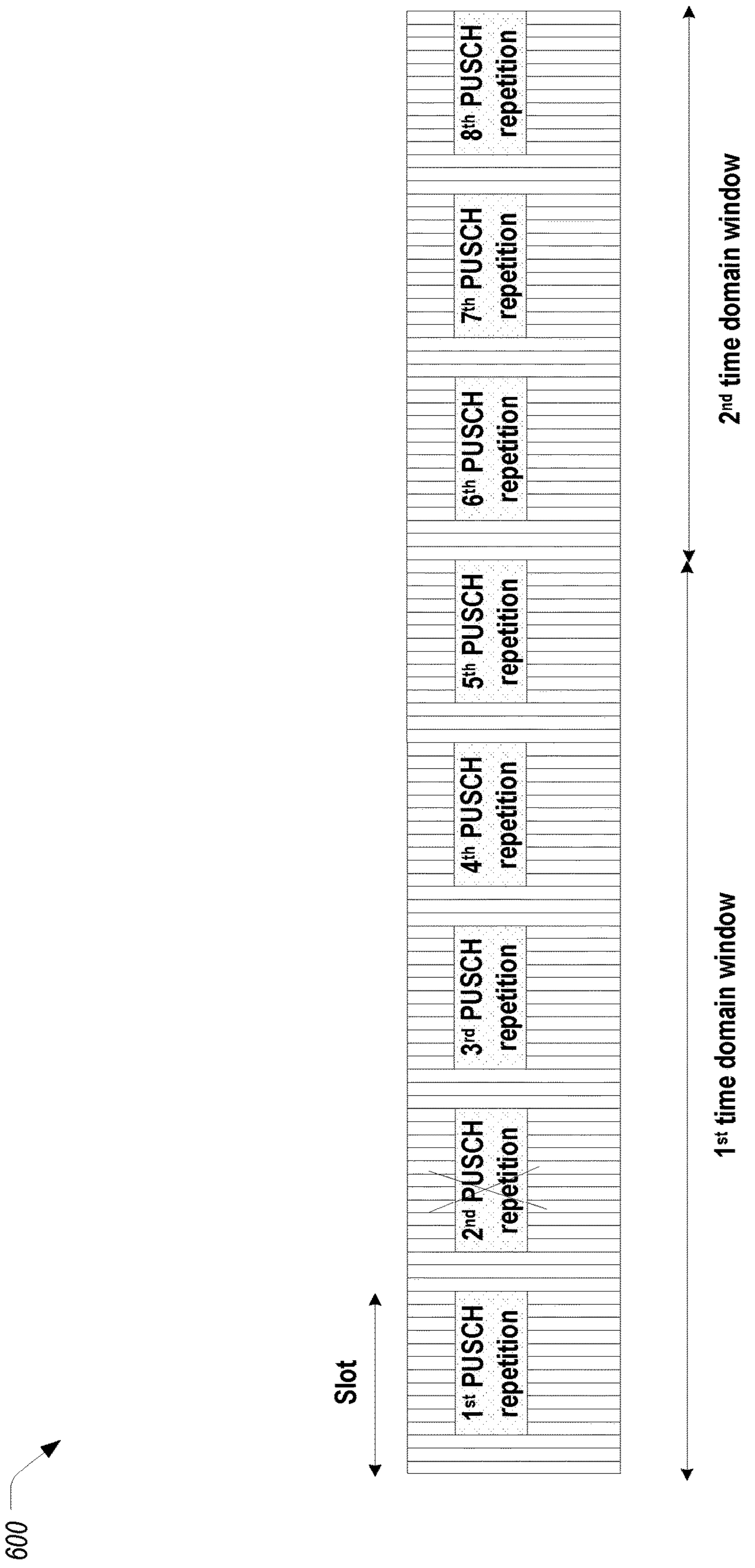
FIG. 6 illustrates a diagram of multiple time domain windows for joint channel estimation as Option 2, in accordance with some aspects.

FIG. 6 illustrates diagram 600 of multiple time domain windows for joint channel estimation as Option 2, in accordance with some aspects. In FIG. 6, eight repetitions are used for PUSCH repetition type A, and the size of the time domain window is configured as four slots. In this case, two-time domain windows for joint channel estimation are used for eight PUSCH repetitions. In the example, in the first time domain window, the UE may not maintain the phase continuity or power consistency due to the cancellation of the 2nd PUSCH repetition. For this option, the first-time domain window is postponed until the four slots for the time domain window are satisfied. Further, the UE may restart the DMRS bundling or need to maintain the phase continuity and power consistency for the 3rd, 4th, and 5th PUSCH repetitions within the first-time domain window for joint channel estimation.

In another embodiment of the invention, for a time domain window for joint channel estimation of uplink transmission, including PUSCH and PUCCH repetition, a contiguous time domain window may be employed for joint channel estimation. Further, within a time domain window for joint channel estimation, if a PUSCH or PUCCH repetition is canceled due to collision with semi-static DL/UL configuration including DL symbols, SSB, CORESET with type 0 common CSS, or invalid symbols, the time domain window is further extended until the number of indicated size is met.

In some embodiments, within a time domain window for joint channel estimation, if a PUSCH or PUCCH repetition is canceled due to collision with dynamic SFI carried by DCI format 2_0, UL CI, uplink transmission with higher priority, etc. If a PUSCH overlaps with PUCCH and UCI is multiplexed on the PUSCH repetition or one of the PUSCH and PUCCH repetitions is canceled. If a UE needs to transmit another uplink channel/signals in a different carrier simultaneously with or without dynamic power sharing. If a UE needs to change frequency resources between PUSCH and/or PUCCH repetitions, the time domain window is not extended.

In another embodiment, for a time domain window for joint channel estimation of uplink transmission, including PUSCH and PUCCH repetition, a non-contiguous time domain window may be employed for joint channel estimation.

In some aspects, within a time domain window for joint channel estimation, if UE cannot maintain phase continuity and/or power consistency due to at least one of, but not limited to the following conditions, the time domain window is restarted after the canceled PUSCH or PUCCH repetition:

(a) If a PUSCH or PUCCH repetition is canceled due to collision with semi-static DL/UL configuration including DL symbols, synchronization signal block (SSB), control resource set (CORESET) with type 0 common search space (CSS), invalid UL symbols, or dynamic slot format indicator (SFI) carried by DCI format 2_0, uplink cancellation indication (UL CI), uplink transmission with higher priority, etc.
(b) If a PUSCH overlaps with PUCCH and UCI is multiplexed on the PUSCH repetition or one of the PUSCH and PUCCH repetitions is canceled.
(c) If a UE needs to receive DL transmission from the gNB and when UE transmits another uplink channel(s) or signal(s) between two successive PUSCH or PUCCH repetitions.
(d) If a UE needs to transmit another uplink channel/signal in a different carrier simultaneously with or without dynamic power sharing.
(e) If a UE needs to change frequency resources between PUSCH and/or PUCCH repetitions.

Figure 7:
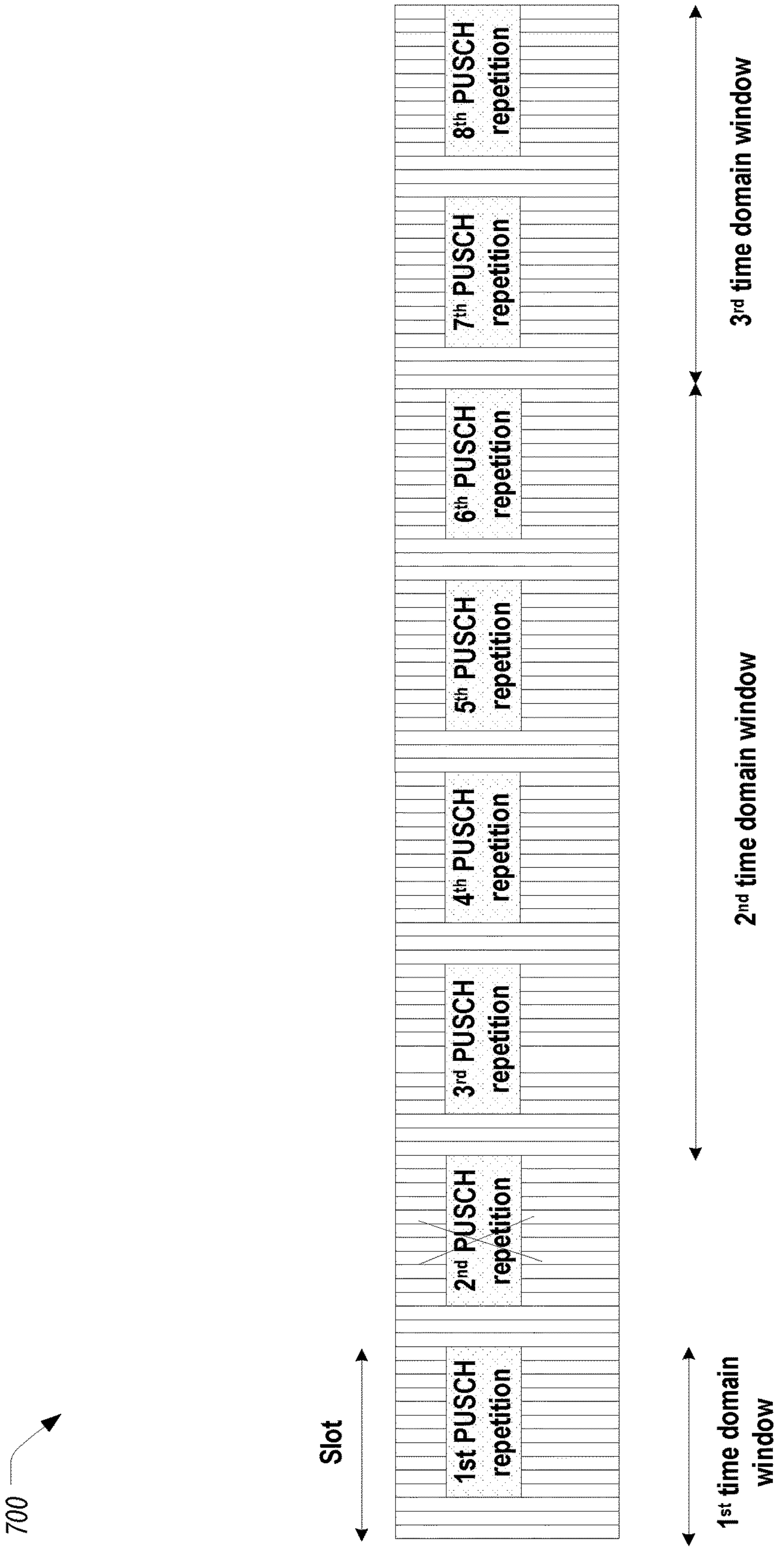
FIG. 7 illustrates a diagram of multiple time domain windows for joint channel estimation as Option 3, in accordance with some aspects.

FIG. 7 illustrates diagram 700 of multiple time domain windows for joint channel estimation as Option 3, in accordance with some aspects. In FIG. 7, eight repetitions are used for PUSCH repetition type A, and the size of the time domain window is configured as four slots. In this case, two-time domain windows for joint channel estimation are used for eight PUSCH repetitions. In some aspects, in the first-time domain window, the UE may not maintain the phase continuity or power consistency due to the cancellation of the 2nd PUSCH repetition. For this option, the second time domain window or DMRS bundling is restarted after the canceled PUSCH repetition and starts from the 3rd PUSCH repetition.

In another embodiment, for a time domain window for joint channel estimation of uplink transmission, including PUSCH and PUCCH repetition, a non-contiguous time domain window may be employed for joint channel estimation. In some aspects, within a time domain window for joint channel estimation, if a PUSCH or PUCCH repetition is canceled due to collision with semi-static DL/UL configuration including DL symbols, SSB, CORESET with type 0 common CSS, or invalid symbols, the time domain window is restarted after the canceled PUSCH or PUCCH repetition.

In some embodiments, within a time domain window for joint channel estimation, if a PUSCH or PUCCH repetition is canceled due to collision with dynamic SFI carried by DCI format 2_0, UL CI, uplink transmission with higher priority, etc. If a PUSCH overlaps with PUCCH and UCI is multiplexed on the PUSCH repetition or one of the PUSCH and PUCCH repetitions is canceled. If a UE needs to transmit another uplink channel/signals in a different carrier simultaneously with or without dynamic power sharing. If a UE needs to change frequency resources between PUSCH and/or PUCCH repetitions, the time domain window is not extended.

In another embodiment of the invention, for the time domain window for joint channel estimation of PUSCH repetition type B or PUCCH with sub-slot-based repetitions, the time domain window may be defined as a unit of nominal repetitions or actual repetitions or slots.

In some embodiments, the above techniques for handling the cancellation of actual or nominal repetition may be applied to the time domain window. For instance, within a time domain window for joint channel estimation, if the UE cannot maintain phase continuity and/or power consistency due to at least one of, but not limited to the following conditions, the time domain window or DMRS bundling may or may not be further extended or may be restarted after the canceled PUSCH or PUCCH repetition:

(a) If a PUSCH or PUCCH repetition is canceled due to collision with semi-static DL/UL configuration including DL symbols, synchronization signal block (SSB), control resource set (CORESET) with type 0 common search space (CSS), invalid UL symbols, or dynamic slot format indicator (SFI) carried by DCI format 2_0, uplink cancellation indication (UL CI), uplink transmission with higher priority, etc.
(b) If a PUSCH overlaps with PUCCH and UCI is multiplexed on the PUSCH repetition or one of the PUSCH and PUCCH repetitions is canceled.
(c) If a UE needs to receive DL transmission from the gNB and when UE transmits another uplink channel(s) or signal(s) between two successive PUSCH or PUCCH repetitions.
(d) If a UE needs to transmit another uplink channel/signal in a different carrier simultaneously with or without dynamic power sharing.
(e) If a UE needs to change frequency resources between PUSCH and/or PUCCH repetitions.

Figure 8:
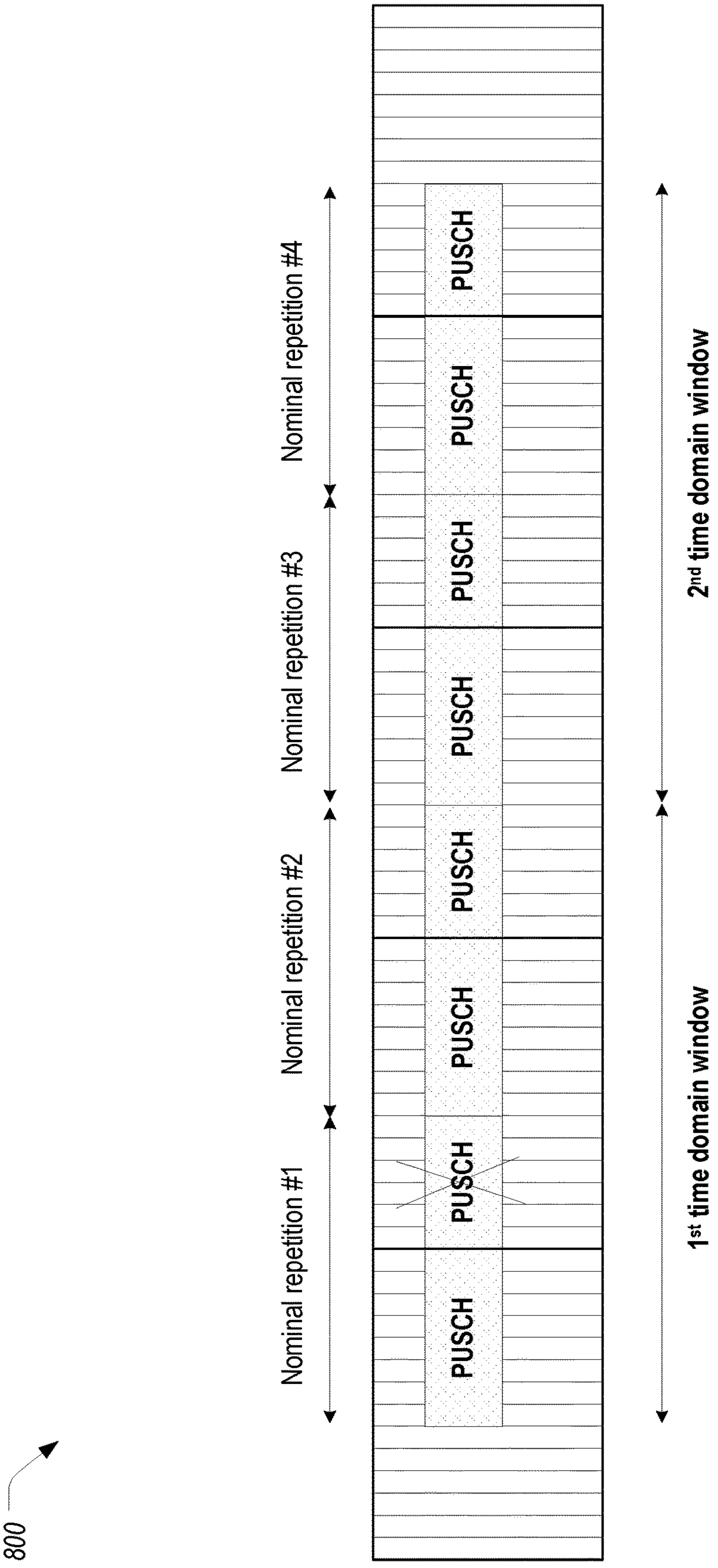
FIG. 8 illustrates a diagram of multiple time domain windows for joint channel estimation of PUSCH repetition type B, in accordance with some aspects.

FIG. 8 illustrates diagram 800 of multiple time domain windows for joint channel estimation of PUSCH repetition type B, in accordance with some aspects. In FIG. 8, four repetitions are used for PUSCH repetition type B, and the size of the time domain window is configured as two nominal repetitions. In this case, two-time domain windows for joint channel estimation are used. In some embodiments, in the first-time domain window, the UE may not maintain the phase continuity or power consistency due to the cancellation of the 2nd PUSCH actual repetition of the first nominal repetition. In this option, the first-time domain window is not postponed.

In another embodiment, for a time domain window for joint channel estimation of uplink transmission, including PUSCH and PUCCH repetition, a non-contiguous time domain window may be employed for joint channel estimation. In some embodiments, this technique can be applied for the case when PUSCH or PUCCH repetition including TBoMS is transmitted based on the available slots or PUSCH/PUCCH repetition in an unpaired spectrum or TDD system.

In some embodiments, the start of each time domain window may be the first slot or repetition of the consecutive slots/repetitions for PUSCH/PUCCH repetitions. In some aspects, within a time domain window, consecutive slots or repetitions are allocated.

In addition, the above embodiments to handle the cancellation of a PUSCH/PUCCH repetition may be applied for the time domain window. For instance, within a time domain window for joint channel estimation, if the UE cannot maintain phase continuity and/or power consistency due to at least one of, but not limited to the following conditions, the time domain window or DMRS bundling may or may not be further extended or may be restarted after the canceled PUSCH or PUCCH repetition:

- (a) If a PUSCH or PUCCH repetition is canceled due to collision with semi-static DL/UL configuration including DL symbols, synchronization signal block (SSB), control resource set (CORESET) with type 0 common search space (CSS), invalid UL symbols, or dynamic slot format indicator (SFI) carried by DCI format 2_0, uplink cancellation indication (UL CI), uplink transmission with higher priority, etc.
- (b) If a PUSCH overlaps with PUCCH and UCI is multiplexed on the PUSCH repetition or one of the PUSCH and PUCCH repetitions is canceled.
- (c) If a UE needs to receive DL transmission from the gNB and when UE transmits another uplink channel(s) or signal(s) between two successive PUSCH or PUCCH repetitions.
- (d) If a UE needs to transmit another uplink channel/signal in a different carrier simultaneously with or without dynamic power sharing.
- (e) If a UE needs to change frequency resources between PUSCH and/or PUCCH repetitions.

Figure 9:
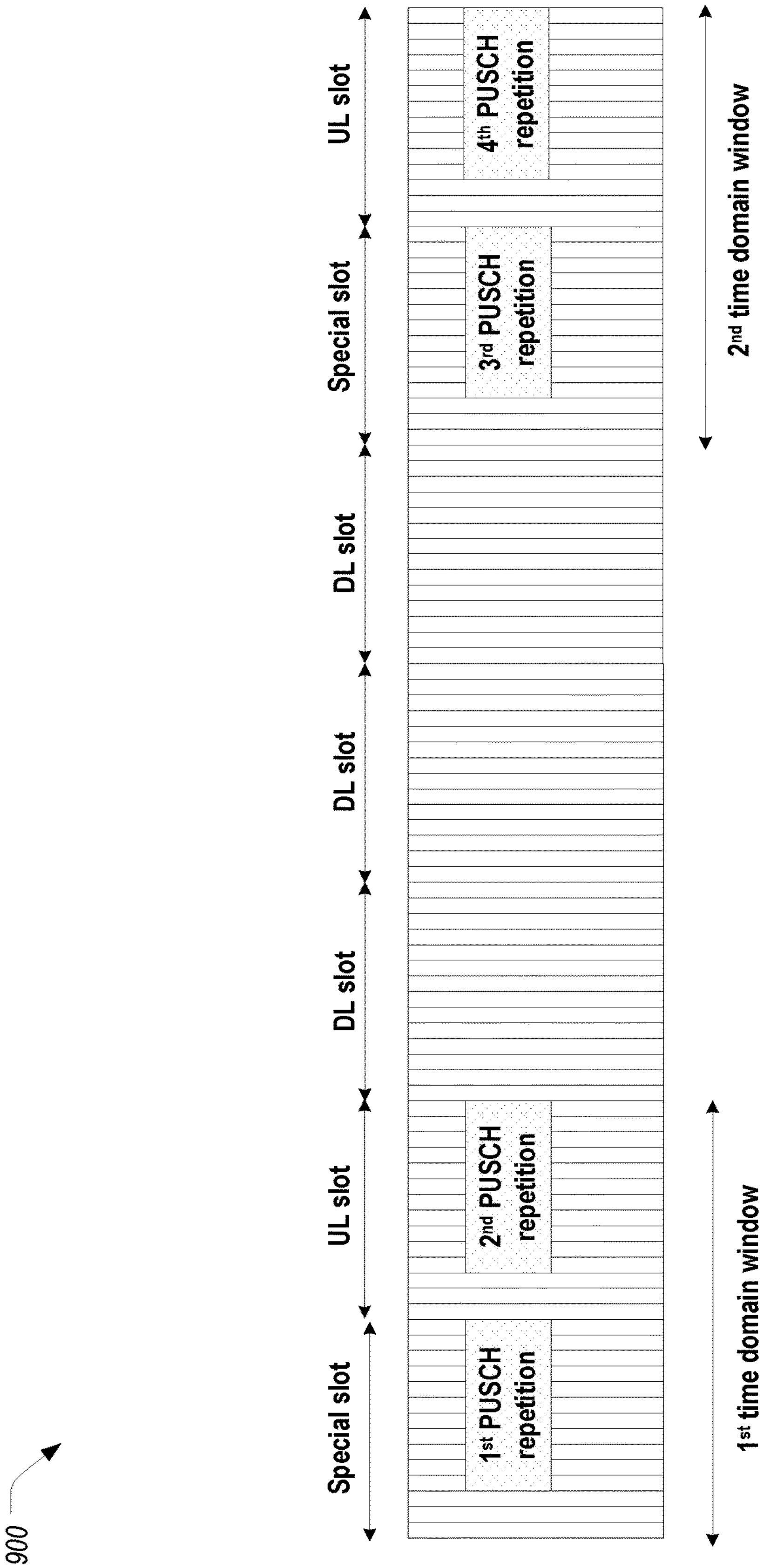
FIG. 9 illustrates a diagram of multiple time domain windows for joint channel estimation as Option 4, in accordance with some aspects.

FIG. 9 illustrates diagram 900 of multiple time domain windows for joint channel estimation as Option 4, in accordance with some aspects. In FIG. 9, four repetitions are used for PUSCH repetition type A which are transmitted based on available slots including special slots and uplink slots, and the size of the time domain window is configured as two slots. In this case, two non-consecutive time domain windows for joint channel estimation are used for 4 PUSCH repetitions. In particular, the first time domain window is applied for 1st and 2nd PUSCH repetitions, and the second time domain window is applied for 3rd and 4th PUSCH repetitions. In this case, the starting position of the subsequent time domain may be determined per the configured time domain window duration and transmission occasion index or available slot or physical slot index for the transmission of PUSCH.

In some embodiments, when the configured time domain window duration is greater than the maximum duration that UE can maintain phase continuity and power consistency, only the events which are semi-statically configured or indicated in the scheduling DCI for PUSCH or PUCCH repetitions can be used to determine the actual time domain window within the configured time domain window. The events may include, but are not limited to the following cases:

- (a) Collision with semi-static DL/UL configuration including DL symbols, SSB, CORESET with type 0 common CSS, or invalid symbols;
- (b) UE needs to change frequency resources between PUSCH and/or PUCCH repetitions;
- (c) UE needs to change precoder as indicated in the scheduling DCI;
- (d) Actual time domain window reaches the maximum duration for DMRS bundling;
- (e) DL reception/monitoring occasions which are configured by MIB, SIB, or RRC configuration between PUSCH and PUCCH repetitions for unpaired spectrum, e.g., PDCCH monitoring, SPS PDSCH reception, etc.; and
- (f) PUSCH repetitions overlap with PUCCH which is semi-statically configured. Or PUCCH repetitions overlap with PUSCH which is not associated with a DCI.

In some embodiments, when the configured time domain window duration is not greater than the maximum duration that the UE can maintain phase continuity and power consistency, the events which are semi-statically configured, dynamically triggered, or indicated in the scheduling DCI for PUSCH or PUCCH repetitions can be used to determine the actual time domain window within the configured time domain window.

For this option, the events may include, but are not limited to the following cases:

- (a) Collision with semi-static DL/UL configuration including DL symbols, SSB, CORESET with type 0 common CSS, or invalid symbols;
- (b) The UE needs to change frequency resources between PUSCH and/or PUCCH repetitions;
- (c) The UE needs to change the precoder as indicated in the scheduling DCI;
- (d) Actual time domain window reaches the maximum duration for DMRS bundling;
- (e) DL reception/monitoring occasions which are configured by MIB, SIB, or RRC configuration between PUSCH and PUCCH repetitions for unpaired spectrum, e.g., PDCCH monitoring, SPS PDSCH reception, etc.;
- (f) PUSCH repetitions overlap with PUCCH which is semi-statically configured. Or PUCCH repetitions overlap with PUSCH which is not associated with a DCI;
- (g) If a PUSCH or PUCCH repetition is canceled due to collision with dynamic slot format indicator (SFI) carried by DCI format 2_0, uplink cancellation indication (UL CI), uplink transmission with higher priority, etc.;
- (h) PUSCH repetitions overlap with PUCCH carrying dynamic HARQ-ACK feedback or one of the PUSCH and PUCCH repetitions is canceled;
- (i) If the UE needs to transmit another uplink channel/signal in a different carrier simultaneously with or without dynamic power sharing; and
- (j) If the UE needs to change transmit power or timing advance during PUSCH or PUCCH repetition.

In some embodiments, for demodulation reference signal (DMRS) bundling for PUCCH repetition in the paired spectrum or FDD system, the configured time domain windows (TDW) are consecutive, and the start of other configured TDW is the first physical slot right after the last physical slot of a previous configured TDW.

In some embodiments, for DMRS bundling for PUCCH repetition in the unpaired spectrum or TDD system, the start of the configured TDWs is determined based on available slots, where the start of a configured TDWs is the first available slot after the last available slot of a previous configured TDW. In some aspects, the available slots are determined according to Section 9.2.6 in 3GPP TS 38.213. In particular, a slot can be determined as an available slot for PUCCH repetitions when a PUCCH repetition does not overlap with DL symbols which are indicated by tdd-UL-DL-ConfigurationCommon or tdd-UL-DL-Configuration-Dedicated or flexible symbols with synchronization signal block (SSB) transmission indicated by ssb-PositionsInBurst.

In some embodiments, the following configurations can be considered in Section 6.1.7 in 3GPP TS 38.214:

(a) For PUCCH repetition in the unpaired spectrum, PUCCH-TimeDomainWindowLength defines the duration of each configured TDW in several slots determined for PUCCH transmission according to clause 9.2.6 of TS 38.213, where:

(a.1) The start of the first configured TDW is the first slot determined for the first PUCCH transmission.

(a.2) The end of the last configured TDW is the last slot determined for the last PUCCH transmission.

(a.3) The start of any other configured TDWs is the first slot determined for PUCCH transmission after the last slot determined for PUCCH transmission of a previous configured TDW.

(b) For PUCCH repetition in the paired spectrum, PUCCH-TimeDomainWindowLength defines the duration of each configured TDW in several consecutive slots, where:

(b.1) The start of the first configured TDW is the first slot for the first PUCCH transmission over the number of consecutive slots.

(b.2) The end of the last configured TDW is the last slot for the last PUCCH transmission over the number of consecutive slots.

(b.3) The start of any other configured TDWs is the first slot after the last slot of a previously configured TDW.

In some embodiments, for DMRS bundling for PUCCH repetition in a half-duplex FDD (HD-FDD) system, the start of the configured TDWs is determined based on available slots, where the start of a configured TDWs is the first available slot after the last available slot of a previous configured TDW. In some aspects, for the determination of available slots for PUCCH repetitions, a slot is determined as an available slot for PUCCH repetitions when a PUCCH repetition does not overlap with flexible symbols with synchronization signal block (SSB) transmission indicated by ssb-PositionsInBurst.

In some embodiments, the following configurations can be considered in Section 6.1.7 in 3GPP TS 38.214:

(a) For PUCCH repetition in the unpaired spectrum or paired spectrum when half-duplex='enable', PUCCH-TimeDomainWindowLength defines the duration of each configured TDW in several consecutive slots, where:

(a.1) The start of the first configured TDW is the first slot determined for the first PUCCH transmission according to clause 9.2.6 of TS 38.213.

(a.2) The end of the last configured TDW is the last slot for the last PUCCH transmission over the number of consecutive slots.

(a.3) The start of any other configured TDWs is the first slot determined for PUCCH transmission after the last slot determined for PUCCH transmission of a previously configured TDW.

(b) For PUCCH repetition in the paired spectrum, PUCCH-TimeDomainWindowLength defines the duration of each configured TDW in several consecutive slots, where:

(b.1) The start of the first configured TDW is the first slot for the first PUCCH transmission over the number of consecutive slots.

(b.2) The end of the last configured TDW is the last slot for the last PUCCH transmission over the number of consecutive slots.

(b.3) The start of any other configured TDWs is the first slot after the last slot of a previously configured TDW.

In some embodiments, similar mechanisms can also be applied for PUSCH repetitions in the HD-FDD system, when counting based on available slots. More specifically, for DMRS bundling for PUSCH repetition in the HD-FDD system when counting based on available slots, the start of the configured TDWs is determined based on available slots, where the start of a configured TDWs is the first available slot after the last available slot of a previous configured TDW.

In some embodiments, the following configurations can be considered in Section 6.1.7 in 3GPP TS 38.214:

(a) For PUSCH transmissions of PUSCH repetition Type A, PUSCH repetition Type B and TB processing over multiple slots], when PUSCH-DMRS-Bundling is enabled, and for PUCCH transmissions of PUCCH repetition, when [PUCCH-DMRS-Bundling] is enabled, the UE determines one or multiple nominal TDWs, as follows:

(a.1) For PUSCH repetition Type A, when AvailableSlotCounting is enabled[, and for TB processing over multiple slots], in the paired spectrum when half-duplex='enable', PUSCH-TimeDomainWindowLength duration of each configured TDW in several consecutive slots, where:

(a.1.1) The start of the first nominal TDW is the first slot determined for the first PUSCH transmission according to clause 6.1.2.1.

(a. 1.2) The end of the last configured TDW is the last slot for the last PUCCH transmission over the number of consecutive slots.

(a.1.3) The start of any other nominal TDWs is the first slot determined for PUSCH transmission after the last slot determined for PUSCH transmission of a previous nominal TDW.

In some embodiments, a system and method of wireless communication for a fifth generation (5G) or new radio (NR) system includes configurations indicated by a base station, such as a time domain window for joint channel estimation of uplink transmission; and configurations maintained by the UE, including phase continuity and power consistency during the time domain window.

In some aspects, the uplink transmission includes but is not limited to the following cases: PUSCH repetition type A based on physical slots, PUSCH repetition type A based on available slots, PUSCH repetition type B, PUCCH with same time domain resource allocation in each slot, PUCCH with sub-slot based repetition, transport block (TB) processing over multiple slots (TBoMS), multiple PUSCHs with different TBs, Msg3 repetition in case of 4-step random access (RACH) procedure, and MsgA PUSCH repetition in case of 2-step RACH procedure.

In some embodiments, for a time domain window for joint channel estimation of uplink transmission, including PUSCH and PUCCH repetition, a contiguous time domain window may be employed for joint channel estimation.

In some aspects, when PUSCH repetition type B is employed, the start of the time domain window is the first actual repetition or nominal repetition, wherein when transport block (TB) processing over multiple slots (TBoMS) is employed, the start of time domain window is the first slot allocated for the TBoMS transmission.

In some aspects, within a time domain window for joint channel estimation, if UE cannot maintain phase continuity and/or power consistency due to at least one of, but not limited to the following conditions, the time domain window is not further extended: if a PUSCH or PUCCH repetition is canceled due to collision with semi-static DL/UL configuration including DL symbols, synchronization signal block (SSB), control resource set (CORESET) with type 0 common search space (CSS), invalid UL symbols, or dynamic slot format indicator (SFI) carried by DCI format 2_0, uplink cancellation indication (UL CI), uplink transmission with higher priority, etc., if a PUSCH overlaps with PUCCH and UCI is multiplexed on the PUSCH repetition or one of the PUSCH and PUCCH repetitions is canceled, if a UE needs to receive DL transmission from the gNB and when UE transmits another uplink channel(s) or signal(s) between two successive PUSCH or PUCCH repetitions, if a UE needs to transmit another uplink channel/signal in a different carrier simultaneously with or without dynamic power sharing, and if a UE needs to change frequency resources between PUSCH and/or PUCCH repetitions.

In some aspects, within a time domain window for joint channel estimation, if the UE cannot maintain phase continuity and/or power consistency due to at least one of, but not limited to the following conditions, the time domain window is further extended until the number of indicated size is met.

In some aspects, within a time domain window for joint channel estimation, if a PUSCH or PUCCH repetition is canceled due to collision with semi-static DL/UL configuration including DL symbols, SSB, CORESET with type 0 common CSS, or invalid symbols, the time domain window is further extended until the number of indicated size is met.

In some aspects, within a time domain window for joint channel estimation, if a PUSCH or PUCCH repetition is canceled due to collision with dynamic SFI carried by DCI format 2_0, UL CI, uplink transmission with higher priority, etc., or if a PUSCH overlaps with PUCCH and UCI is multiplexed on the PUSCH repetition or one of the PUSCH and PUCCH repetitions is canceled, or if a UE needs to transmit another uplink channels/signals in a different carrier simultaneously with or without dynamic power sharing, or if a UE needs to change frequency resources between PUSCH and/or PUCCH repetitions, the time domain window is not extended.

In some aspects, within a time domain window for joint channel estimation, if the UE cannot maintain phase continuity and/or power consistency due to at least one of, but not limited to the following conditions, the time domain window is restarted after the canceled PUSCH or PUCCH repetition.

In some embodiments, for a time domain window for joint channel estimation of uplink transmission, including PUSCH and PUCCH repetition, a non-contiguous time domain window may be employed for joint channel estimation. Furthermore, within a time domain window for joint channel estimation, if a PUSCH or PUCCH repetition is canceled due to collision with semi-static DL/UL configuration including DL symbols, SSB, CORESET with type 0 common CSS, or invalid symbols, the time domain window is restarted after the canceled PUSCH or PUCCH repetition.

In some embodiments, for the time domain window for joint channel estimation of PUSCH repetition type B or PUCCH with sub-slot-based repetitions, the time domain window may be defined as a unit of nominal repetitions or actual repetitions or slots.

In some aspects, for the time domain window for joint channel estimation of uplink transmission, including PUSCH and PUCCH repetition, a non-contiguous time domain window may be employed for joint channel estimation.

In some embodiments, the start of each time domain window may be the first slot or repetition of the consecutive slots/repetitions for PUSCH/PUCCH repetitions.

In some aspects, the above embodiments to handle the cancellation of a PUSCH/PUCCH repetition may be applied for the time domain window.

In some aspects, when the configured time domain window duration is greater than the maximum duration that UE can maintain phase continuity and power consistency, only the events which are semi-statically configured or indicated in the scheduling DCI for PUSCH or PUCCH repetitions can be used to determine the actual time domain window within the configured time domain window In some embodiments, when the configured time domain window duration is not greater than the maximum duration that UE can maintain phase continuity and power consistency, the events which are semi-statically configured, dynamically triggered, or indicated in the scheduling DCI for PUSCH or PUCCH repetitions can be used to determine the actual time domain window within the configured time domain window.

In some embodiments, for DMRS bundling for PUCCH repetition in the paired spectrum or FDD system, the configured time domain windows (TDW) are consecutive, and the start of other configured TDW is the first physical slot right after the last physical slot of a previous configured TDW.

In some embodiments, for DMRS bundling for PUCCH repetition in the unpaired spectrum or TDD system, the configured TDWs are determined based on available slots, where the start of a configured TDW is the first available slot after the last available slot of a previous configured TDW.

In some embodiments, for DMRS bundling for PUCCH repetition in a half-duplex FDD (HD-FDD) system, the start of the configured TDWs is determined based on available slots, where the start of a configured TDWs is the first available slot after the last available slot of a previous configured TDW.

In some aspects, for DMRS bundling for PUSCH repetition in the HD-FDD system when counting based on available slots, the start of the configured TDWs is determined based on available slots, where the start of a configured TDWs is the first available slot after the last available slot of a previous configured TDW.

Figure 10:
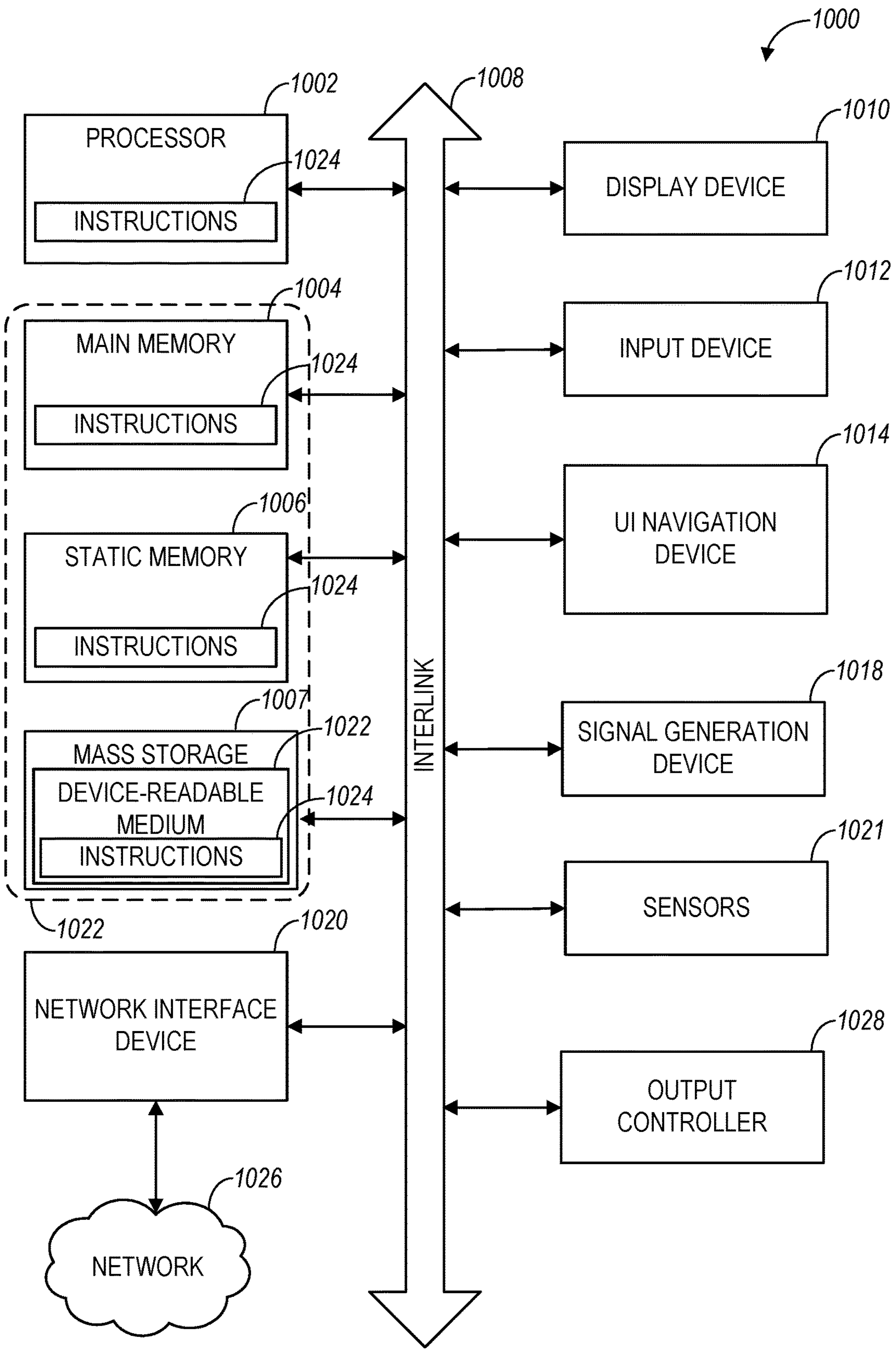
FIG. 10 illustrates a block diagram of a communication device such as an evolved Node-B (eNB), a new generation Node-B (gNB) (or another RAN node or a base station), a transmission-reception point (TRP), an access point (AP), a wireless station (STA), a mobile station (MS), or a user equipment (UE), in accordance with some aspects.

FIG. 10 illustrates a block diagram of a communication device such as an evolved Node-B (eNB), a new generation Node-B (gNB) (or another RAN node or a base station), a transmission-reception point (TRP), an access point (AP), a wireless station (STA), a mobile station (MS), or a user equipment (UE), in accordance with some aspects. In alternative aspects, the communication device 1000 may operate as a standalone device or may be connected (e.g., networked) to other communication devices.

Circuitry (e.g., processing circuitry) is a collection of circuits implemented in tangible entities of the device 1000 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1000 follow.

In some aspects, the device 1000 may operate as a standalone device or may be connected (e.g., networked) to other devices. In a networked deployment, the communication device 1000 may operate in the capacity of a server communication device, a client communication device, or both in server-client network environments. In an example, the communication device 1000 may act as a peer communication device in a peer-to-peer (P2P) (or other distributed) network environment. The communication device 1000 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 1000 may include a hardware processor 1002 (e.g., a central processing unit (CPU), a graphics processing unit (GPU), a hardware processor core, or any combination thereof), a main memory 1004, a static memory 1006, and a storage device 1007 (e.g., hard drive, tape drive, flash storage, or other block or storage devices), some or all of which may communicate with each other via an interlink (e.g., bus) 1008.

The communication device 1000 may further include a display device 1010, an alphanumeric input device 1012 (e.g., a keyboard), and a user interface (UI) navigation device 1014 (e.g., a mouse). In an example, the display device 1010, input device 1012, and UI navigation device 1014 may be touchscreen display. The communication device 1000 may additionally include a signal generation device 1018 (e.g., a speaker), a network interface device 1020, and one or more sensors 1021, such as a global positioning system (GPS) sensor, compass, accelerometer, or another sensor. The communication device 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1007 may include a communication device-readable medium 1022, on which is stored one or more sets of data structures or instructions 1024 (e.g., software) embodying or utilized by any one or more of the techniques or functions described herein. In some aspects, registers of the processor 1002, the main memory 1004, the static memory 1006, and/or the storage device 1007 may be, or include (completely or at least partially), the device-readable medium 1022, on which is stored the one or more sets of data structures or instructions 1024, embodying or utilized by any one or more of the techniques or functions described herein. In an example, one or any combination of the hardware processor 1002, the main memory 1004, the static memory 1006, or the storage device 1007 may constitute the device-readable medium 1022.

As used herein, the term "device-readable medium" is interchangeable with "computer-readable medium" or "machine-readable medium". While the communication device-readable medium 1022 is illustrated as a single medium, the term "communication device-readable medium" may include a single medium or multiple media (e.g., a centralized or distributed database, and/or associated caches and servers) configured to store the one or more instructions 1024. The term "communication device-readable medium" is inclusive of the terms "machine-readable medium" or "computer-readable medium", and may include any medium that is capable of storing, encoding, or carrying instructions (e.g., instructions 1024) for execution by the communication device 1000 and that causes the communication device 1000 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 1024 may further be transmitted or received over a communications network 1026 using a transmission medium via the network interface device 1020 utilizing any one of a number of transfer protocols. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one single-input-multiple-output (SIMO), MIMO, or multiple-input-single-output (MISO) techniques. In some examples, the network interface device 1020 may wirelessly communicate using Multiple User MIMO techniques.

The term "transmission medium" shall be taken to include any intangible medium that is capable of storing, encoding, or carrying instructions for execution by the communication device 1000, and includes digital or analog communications signals or another intangible medium to facilitate communication of such software. In this regard, a transmission medium in the context of this disclosure is a device-readable medium.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Described implementations of the subject matter can include one or more features, alone or in combination as illustrated below by way of examples.

Example 1 is an apparatus for a user equipment (UE) configured for operation in a Fifth Generation New Radio (5G NR) and beyond wireless network, the apparatus comprising: processing circuitry, wherein to configure the UE for joint channel estimation of uplink transmissions in the 5G NR and beyond wireless network, the processing circuitry is to: decode downlink control information (DCI) or higher layer signaling received from a base station, the DCI or the higher layer signaling indicating a number of physical uplink shared channel (PUSCH) repetitions forming the uplink transmissions; decode higher layer signaling received from the base station, the higher layer signaling indicating a size of a time domain window (TDW) associated with the uplink transmissions; and encode data for the PUSCH repetitions within the TDW, the TDW having a number of slots equal to the size, and each of the PUSCH repetitions within the TDW associated with a same carrier phase and a same transmit power; and a memory coupled to the processing circuitry and configured to store the DCI and the higher layer signaling.

In Example 2, the subject matter of Example 1 includes subject matter where the PUSCH repetitions are configured with at least one TDW, and wherein an ending slot of a last TDW is a last slot of a last PUSCH repetition of the PUSCH repetitions.

In Example 3, the subject matter of Examples 1-2 includes subject matter where the processing circuitry is configured to: detect an event causing a disruption in each of the PUSCH repetitions within the TDW having the same carrier phase and the same transmit power.

In Example 4, the subject matter of Example 3 includes subject matter where the processing circuitry is configured to: configure an ending slot of the TDW to end with a last symbol of the uplink transmissions before the event; or configure to restart the TDW after the event.

In Example 5, the subject matter of Examples 3-4 includes subject matter where the processing circuitry is configured to: detect a subset of the PUSCH repetitions within a configured TDW are completed before the event; configure a second TDW having the number of slots equal to the size, the second TDW being non-contiguous with the TDW; and cause transmission of a remaining subset of the PUSCH repetitions during the second TDW.

In Example 6, the subject matter of Examples 3-5 includes, common CSS, or invalid symbols.

In Example 7, the subject matter of Examples 3-6 includes subject matter where the event is at least one of the PUSCH repetitions overlaps with a physical uplink control channel (PUCCH) with different priorities.

In Example 8, the subject matter of Examples 3-7 includes subject matter where the event is at least one of PUCCH repetitions within the TDW overlaps with a PUSCH that is not configured by the DCI.

In Example 9, the subject matter of Examples 3-8 includes subject matter where the event is at least one of the PUSCH repetitions overlaps with a physical uplink control channel (PUCCH) carrying dynamic hybrid automatic repeat request acknowledgment (HARQ-ACK) feedback or at least one of the PUSCH repetitions is canceled.

In Example 10, the subject matter of Examples 3-9 includes subject matter where the event is associated with transmission by the UE of another uplink channel in a different carrier simultaneously with or without dynamic power sharing.

In Example 11, the subject matter of Examples 1-10 includes, transceiver circuitry coupled to the processing circuitry; and two or more antennas coupled to the transceiver circuitry.

Example 12 is a computer-readable storage medium that stores instructions for execution by one or more processors of a user equipment (UE), the instructions to configure the UE for joint channel estimation of uplink transmissions in a Fifth Generation New Radio (5G NR) and beyond wireless network, and to cause the UE to perform operations comprising: decoding downlink control information (DCI) or higher layer signaling received from a base station, the DCI or the higher layer signaling indicating a number of physical uplink shared channel (PUSCH) repetitions forming the uplink transmissions; decoding higher layer signaling received from the base station, the higher layer signaling indicating a size of a time domain window (TDW) associated with the uplink transmissions; and encoding data for the PUSCH repetitions within the TDW, the TDW having a number of slots equal to the size, and each of the PUSCH repetitions within the TDW associated with a same carrier phase and a same transmit power.

In Example 13, the subject matter of Example 12 includes subject matter where the PUSCH repetitions are configured with at least one TDW, and wherein an ending slot of a last TDW is a last slot of a last PUSCH repetition of the PUSCH repetitions.

In Example 14, the subject matter of Examples 12-13 includes, the operations further comprising: detecting an event causing a disruption in each of the PUSCH repetitions within the TDW having the same carrier phase and the same transmit power.

In Example 15, the subject matter of Example 14 includes, the operations further comprising: configuring an ending slot of the TDW to end with a last symbol of the uplink transmissions before the event.

In Example 16, the subject matter of Examples 14-15 includes, the operations further comprising: detecting a subset of the PUSCH repetitions within a configured TDW are completed before the event; configuring a second TDW having the number of slots equal to the size, the second TDW being non-contiguous with the TDW; and causing transmission of a remaining subset of the PUSCH repetitions during the second TDW.

In Example 17, the subject matter of Examples 14-16 includes, common CSS, or invalid symbols.

In Example 18, the subject matter of Examples 14-17 includes subject matter where the event is at least one of the PUSCH repetitions overlaps with a physical uplink control channel (PUCCH) with different priorities.

Example 19 is a computer-readable storage medium that stores instructions for execution by one or more processors of a base station, the instructions to configure the base station for joint channel estimation of uplink transmissions in a Fifth Generation New Radio (5G NR) and beyond wireless network, and to cause the base station to perform operations comprising: encoding downlink control information (DCI) or higher layer signaling for transmission to a user equipment (UE), the DCI or the higher layer signaling indicating a number of physical uplink shared channel (PUSCH) repetitions forming the uplink transmissions; encoding higher layer signaling for transmission to the UE, the higher layer signaling indicating a size of a time domain window (TDW) associated with the uplink transmissions; and decoding data received via the PUSCH repetitions within the TDW, the TDW having a number of slots equal to the size, and each of the PUSCH repetitions within the actual TDW associated with a same carrier phase and a same transmit power.

In Example 20, the subject matter of Example 19 includes subject matter where the PUSCH repetitions are configured within at least one TDW, and wherein an ending slot of a last TDW is a last slot of a last PUSCH repetition of the PUSCH repetitions.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a user equipment (UE) configured for operation in a Fifth Generation New Radio (5G NR) network, the apparatus comprising:

processing circuitry, wherein to configure physical uplink shared channel (PUSCH) transmission repetitions in the 5G NR network, the processing circuitry is to:

decode higher layer signaling enabling PUSCH demodulation reference signal (DM-RS) bundling and enabling available slot counting;

decode a downlink control information (DCI) format, the DCI format scheduling PUSCH transmissions of a PUSCH repetition Type A based on available slots in a time domain window (TDW), the TDW being determined based on the higher layer signaling enabling the PUSCH DM-RS bundling;

determine a starting slot of the TDW as a first slot determined for a first PUSCH transmission of the PUSCH transmissions based on the available slots; and encode data for the first PUSCH transmission in the TDW, the first PUSCH transmission starting at the first slot.

2. The apparatus of claim 1, wherein the processing circuitry is to:

detect an event causing power consistency and phase continuity not to be maintained across the PUSCH transmissions of the PUSCH repetition type A scheduled by the DCI format.

3. The apparatus of claim 2, wherein the processing circuitry is to:

configure a last symbol of a PUSCH transmission of the PUSCH transmissions at an end of the TDW, the PUSCH transmission occurring before the event.

4. The apparatus of claim 2, wherein the event causing the power consistency and the phase continuity not to be maintained across the PUSCH transmissions is based on a collision with a downlink reception using a downlink slot.

5. The apparatus of claim 1, wherein the DCI format configures a plurality of TDWs, the plurality of TDWs being non-contiguous and including the TDW.

6. The apparatus of claim 2, wherein the processing circuitry is to:

decode higher layer signaling received from a base station, the higher layer signaling indicating a size of the TDW associated with the PUSCH transmissions, wherein the TDW includes a number of slots equal to the size, and each PUSCH repetition of a plurality of PUSCH repetitions within the TDW is associated with a same carrier phase and a same transmit power.

7. The apparatus of claim 6, wherein the processing circuitry is configured to:

detect a subset of the PUSCH repetitions within a configured TDW are completed before the event;

configure a second TDW having a number of slots equal to the size, the second TDW being non-contiguous with the TDW; and cause a transmission of a remaining subset of the PUSCH repetitions during the second TDW.

8. The apparatus of claim 6, wherein the event is a collision with semi-static downlink (DL) or uplink (UL) configuration including DL symbols, a synchronization signal block (SSB), a control resource set (CORESET) with type 0 common CSS, or invalid symbols.

9. The apparatus of claim 6, wherein the event is at least one of the PUSCH repetitions overlaps with a physical uplink control channel (PUCCH) with different priorities.

10. The apparatus of claim 6, wherein the event is at least one of the PUSCH repetitions overlaps with a physical uplink control channel (PUCCH) carrying dynamic hybrid automatic repeat request acknowledgement (HARQ-ACK) feedback or at least one of the PUSCH repetitions is cancelled.

11. The apparatus of claim 1, further comprising:

transceiver circuitry coupled to the processing circuitry; and two or more antennas coupled to the transceiver circuitry.

12. A non-transitory computer-readable storage medium that stores instructions for execution by one or more processors of a base station, the instructions to configure the base station for communication in a Fifth Generation New Radio (5G NR) and beyond wireless network, and to cause the base station to perform operations comprising:

encoding higher layer signaling for transmission to a user equipment (UE), the higher layer signaling enabling PUSCH demodulation reference signal (DM-RS) bundling and enabling available slot counting;

encoding a downlink control information (DCI) format for transmission to the UE, the DCI format scheduling physical uplink shared channel (PUSCH) transmissions of a PUSCH repetition Type A based on available slots in a time domain window (TDW), the TDW being determined based on the higher layer signaling enabling the PUSCH DM-RS bundling; and decoding data from a first PUSCH transmission in the TDW, the first PUSCH transmission starting at a first slot, and the first slot being a starting slot determined for the first PUSCH transmission based on the available slots.

13. The non-transitory computer-readable storage medium of claim 12, wherein a last symbol of a PUSCH transmission of the PUSCH transmissions is at an end of the TDW, wherein the PUSCH transmission occurs before an event, and wherein the event causes power consistency and phase continuity not to be maintained across the PUSCH transmissions of the PUSCH repetition type A scheduled by the DCI format.

14. The non-transitory computer-readable storage medium of claim 13, wherein the event causing the power consistency and the phase continuity not to be maintained across the PUSCH transmissions is based on a collision with a downlink reception using a downlink slot.

15. The non-transitory computer-readable storage medium of claim 12, wherein the DCI format configures a plurality of TDWs, the plurality of TDWs being non-contiguous and including the TDW.

16. A user equipment (UE) comprising:

transceiver circuitry coupled to one or more antennas; and processing circuitry coupled to the transceiver circuitry, wherein to configure physical uplink shared channel (PUSCH) transmission repetitions using the transceiver circuitry in a Fifth Generation New Radio (5G NR) and beyond network, the processing circuitry is to:

decode higher layer signaling enabling PUSCH demodulation reference signal (DM-RS) bundling and enabling available slot counting;

decode a downlink control information (DCI) format, the DCI format scheduling PUSCH transmissions of a PUSCH repetition Type A based on available slots in a time domain window (TDW), the TDW being determined based on the higher layer signaling enabling the PUSCH DM-RS bundling:

determine a starting slot of the TDW as a first slot determined for a first PUSCH transmission of the PUSCH transmissions based on the available slots; and encode data for the first PUSCH transmission in the TDW, the first PUSCH transmission starting at the first slot.

17. The UE of claim 16, wherein the processing circuitry is to:

detect an event causing power consistency and phase continuity not to be maintained across the PUSCH transmissions of the PUSCH repetition type A scheduled by the DCI format.

18. The UE of claim 17, wherein the processing circuitry is to:

configure a last symbol of a PUSCH transmission of the PUSCH transmissions at an end of the TDW, the PUSCH transmission occurring before the event.

19. The UE of claim 17, wherein the event causing the power consistency and the phase continuity not to be maintained across the PUSCH transmissions is based on a collision with a downlink reception using a downlink slot.

20. The UE of claim 16, wherein the DCI format configures a plurality of TDWs, the plurality of TDWs being non-contiguous and including the TDW.

* * * * *